United States Patent [19]
Gordon et al.

[11] 3,976,864
[45] Aug. 24, 1976

[54] APPARATUS AND METHOD FOR TESTING DIGITAL CIRCUITS

[75] Inventors: Gary B. Gordon, Saratoga, Calif.; George A. Haag, Colorado Springs, Colo.; Jan R. Hofland, Sunnyvale, Calif.; Daniel I. Kolody, Black Forrest, Colo.

[73] Assignee: Hewlett-Packard Company, Palo Alto, Calif.

[22] Filed: Sept. 3, 1974

[21] Appl. No.: 502,326

[52] U.S. Cl. ............ 235/153 AC; 324/73 R
[51] Int. Cl.² .......................... G06F 11/00
[58] Field of Search ............ 235/153 AC; 324/73 R; 340/172.5

[56] References Cited
UNITED STATES PATENTS

| | | | |
|---|---|---|---|
| 3,582,633 | 6/1971 | Webb | 235/153 AC |
| 3,651,315 | 3/1972 | Collins | 324/73 R |
| 3,739,160 | 6/1973 | El-Hassan et al. | 235/153 AC |
| 3,777,129 | 12/1973 | Mehia | 324/73 R |
| 3,780,277 | 12/1973 | Armstrong et al. | 235/153 AC |
| 3,812,426 | 5/1974 | Illian | 235/153 AC |
| 3,813,647 | 5/1974 | Loo | 340/172.5 |
| 3,821,645 | 6/1974 | Vinsani | 324/73 R |
| 3,826,909 | 7/1974 | Ivashin | 235/153 AC |
| 3,832,535 | 8/1974 | Vito | 235/153 AC |

*Primary Examiner*—Charles E. Atkinson
*Attorney, Agent, or Firm*—Patrick J. Barrett

[57] ABSTRACT

A device is disclosed which converts a digital signal or bit stream into a digital signature repesentative of the digital signal by means of a feedback shift register. The apparatus may be used to identify and characterize digital signals at various test points in an apparatus for testing purposes. Signatures for digital signals from properly operating circuits can be recorded in a variety of fashions for later comparison with signatures of digital signals from circuits under test. The comparison of the signatures enables a person using the apparatus to determine whether the circuit under test is operating properly and, if it is not, to locate the fault in many instances. The apparatus may also be used to examine digital signals to enable identification of transient errors.

21 Claims, 26 Drawing Figures

FIGURE 4A

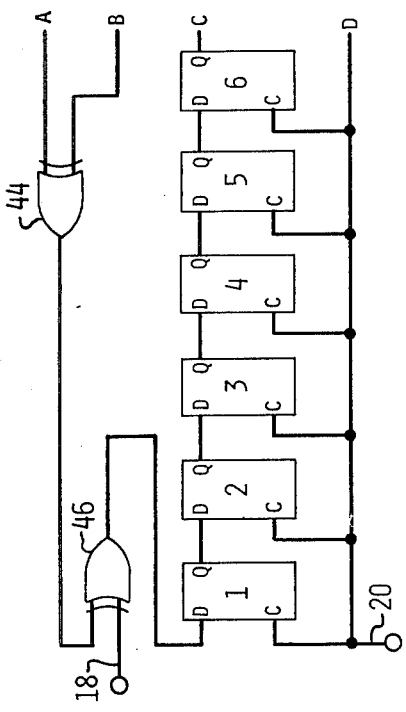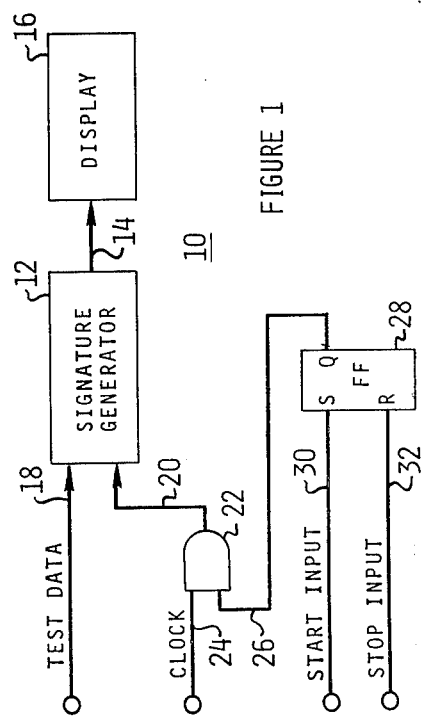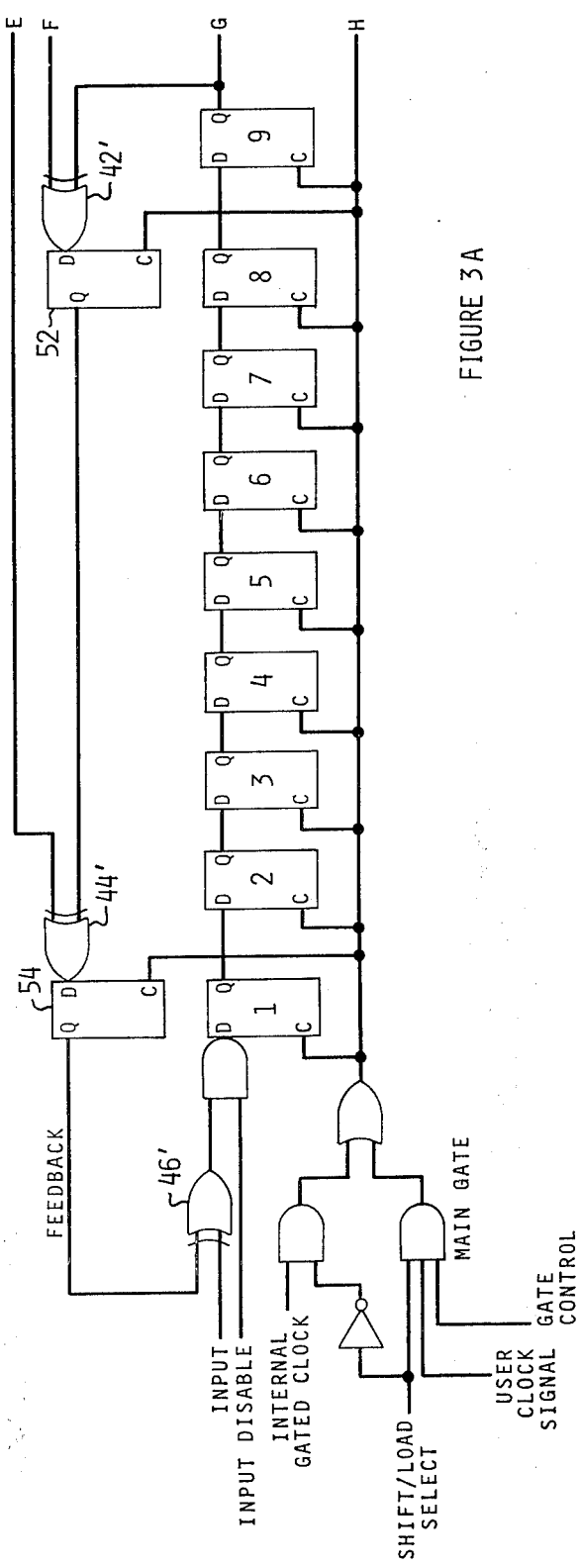

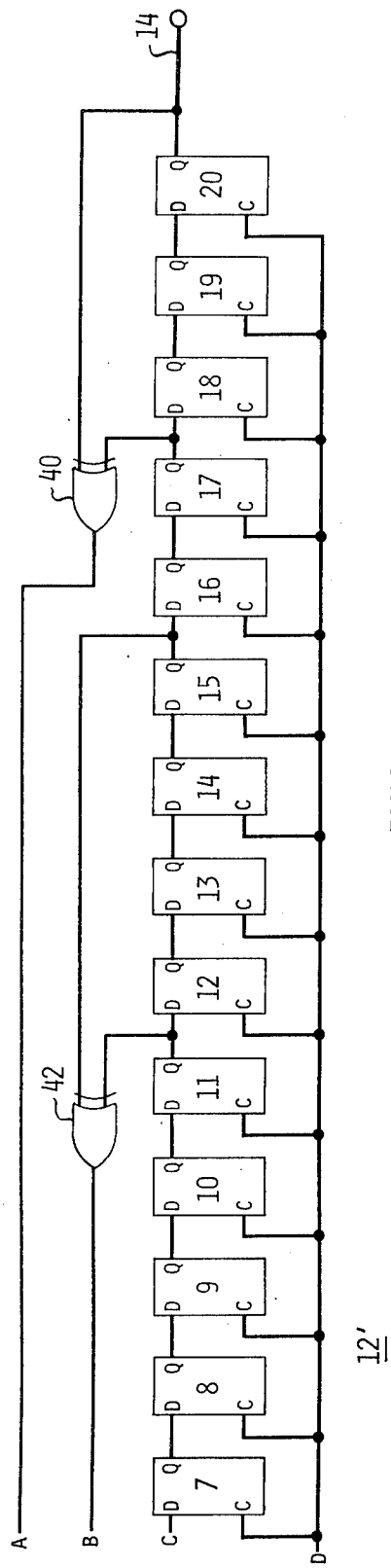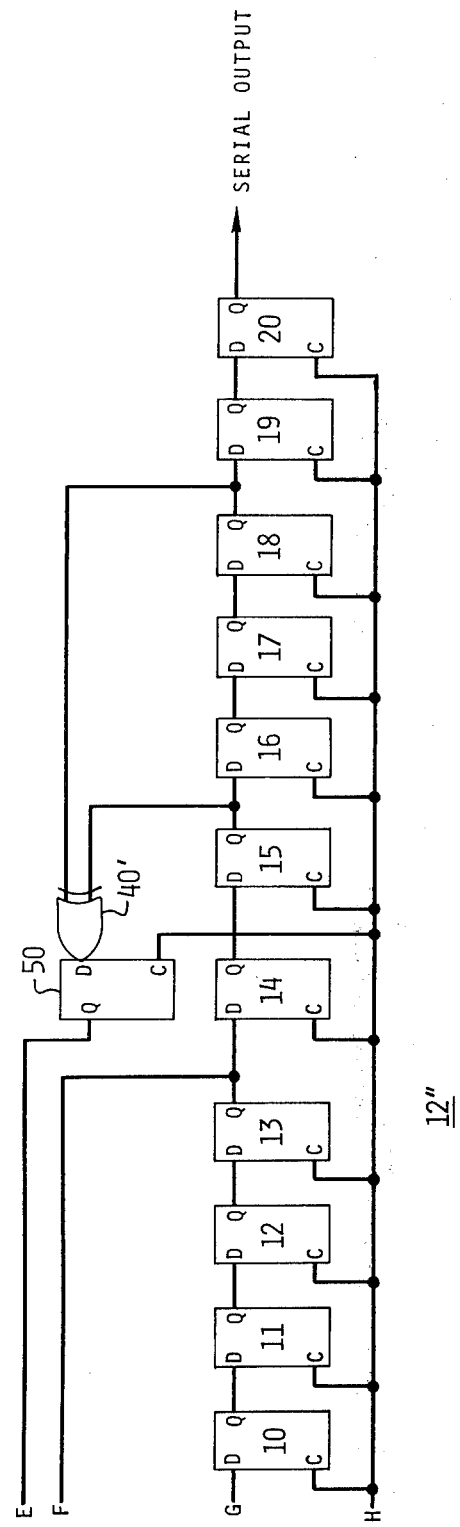
FIGURE 2B
FIGURE 3B

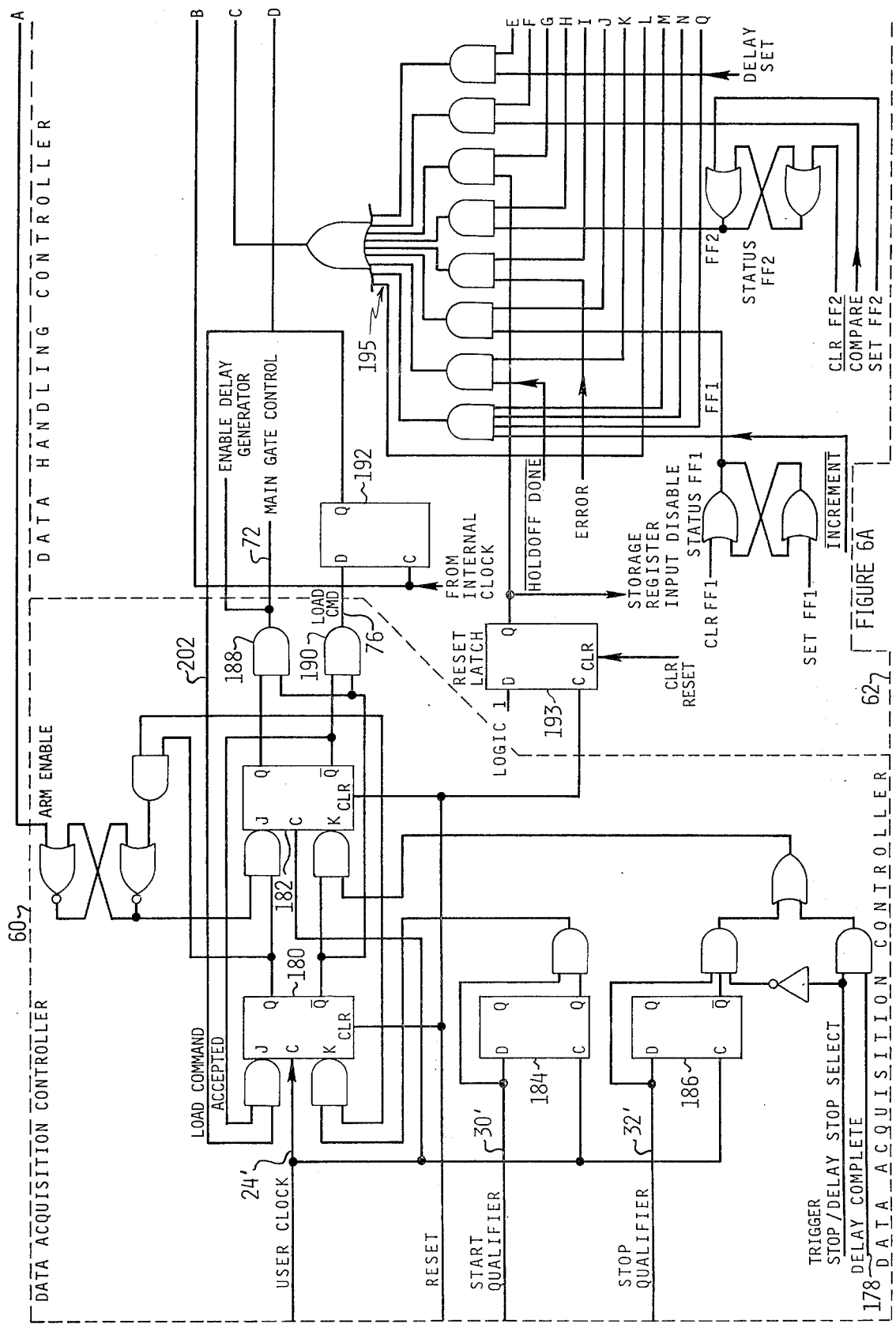

APPARATUS AND METHOD FOR TESTING DIGITAL CIRCUITS

BACKGROUND OF THE INVENTION

The testing of digital circuitry presents a number of challenges not found in the area of analog circuit testing. In analog circuit testing a circuit can be characterized by various voltage levels or current levels at certain test points or by the frequencies of certain signals at those test points. In addition, most analog circuits have known or measurable transfer functions which can be analyzed with the help of instruments such as network analyzers. Although also used in conjunction with digital circuits, the foregoing types of measurements are not as helpful in characterizing, analyzing, or diagnosing digital circuitry. The signals of interest in an operating digital system are usually a series of pulses or binary digits which have a certain time relationship to a clock in the system. The informational content of these digital signals or data streams is usually of much more interest than the particular voltage or current levels or the repetition rate of the signal.

Voltage or current level measurement is used on connection with digital circuits to determine that the circuit is at least operating is some manner, and for this purpose devices such as logic probes that give a visual indication of the presence of pulses are used by logic designers and technicians. Depending upon the repetition rate of the pulses, voltmeters and oscilloscopes may also be used for this purpose; and, indeed, and oscilloscope may also be used to display a series of pulses. Level indications by voltmeters and logic probes are not very helpful, however, when it comes to determining the correctness of a digital signal comprising a stream of bits. Oscilloscopes are somewhat more helpful because they can display a series of pulses and can display the series of pulses in relationship with other pulses in the system. Oscilloscopes, however, are also limited in the number of pulses that can be conveniently displayed on the screen. Even with a high display capacity, however, oscilloscopes also have the shortcoming in that the user is required to compare the long series of pulses displayed, bit by bit, with the series that should be displayed for a correctly operating circuit. With the long data streams used in modern digital instruments such as calculators and computers this comparison can be very tedious process.

Other kinds of test instruments are also used to detect some minimal level of operation by the circuit. In this category are instruments such as frequency or event counters and transition counters. The frequency counter tells the repetition rate of the signal from the circuit being tested and is useful for verifying proper operation of a system clock. However, such a counter does not help in determining the correctness of a digital signal. Event or ones counters and transition counters are somewhat more helpful since the number of ones or transitions in the data stream from a properly operating circuit can be easily predicted and measured. However, such a test is by no means foolproof since a number of errors can arise that change desired sequence of bits in a digital signal but do not change the number of ones or transitions in it.

Because of the limitations enumerated above, it is very difficult for a test technician to locate a faulty circuit in a large or complex digital system with currently available test equipment. Often the test technician is faced with having to replace one circuit at a time until the system works properly. This method can be very time-consuming and requires a large inventory of spare circuits which the test technician must have available. Even after the faulty circuit has been replaced it is often difficult to isolate the problem and repair the circuit. The result is that expensive circuits may have to be discarded.

SUMMARY OF THE INVENTION

In most situtations in which a digital circuit or system is being tested, digital signals are available at various points in the circuit or system which indicate the operation of the circuit. According to a preferred embodiment of the present invention a signature generator is provided to convert digital signals from the circuit under test into a signature characterizing that digital signal. Such a signature generator is a state machine which combines each bit of an input digital signal or data stream with various bits representing the present digital state of the state machine. This present state is determined by the previous input bits and state machine states. A state machine may be implemented, for example, by a shift register having feedback from preselected points in the shift register so that the bits at those preselected points are combined according to the rules of binary arithmetic with the input bits to the shift register. The result, in essence, is a combination of each bit of the digital signal with selected ones of the preceding bits. The signature generator generates a word or signature which can accurately characterize a data stream much longer than the signature. In addition, the signature can conveniently be displayed as a series of alphanumeric characters.

The use of a digital signature generator as described above can facilitate testing of digital circuits in several ways. Various test points in a digital circuit that is known to be operating correctly can be characterized using the signature generator and the signature can be recorded on a schematic for later use by a test technician. When the test technician is testing a digital circuit or system to locate a fault, he can use the signature generator to test each of the test points to verify that the proper signature is present. A table of faulty signatures can also be developed for each circuit so that when the test technician does not get the proper signature at a test point, he can look in the table to find out what portion of the circuit is operating incorrectly. Thus this measurement technique allows the technician to determine not only which circuit, but which portion of the circuit, is operating improperly in a fraction of the time that is needed with currently used instrumentation.

A test technician can also use such a signature generator to locate intermittent faults that show up in a data stream from a circuit that appears to be operating correctly. According to another embodiment of the present invention, the signature generator can store and compare signatures of successive repetitions of a digital signal and can indicate when there is a difference in the digital signals from one repetition to the next.

A digital signature depends upon both the content and length of a digital signal, and various means of triggering the signature generator can be used so that the desired portion of a digital signal is characterized. A simple timing pulse can be used to start and stop the generation of a signature and the timing pulse may be derived from a selected portion of the circuit under test. Alternatively, the signature generator can be made to function for a predetermined number of clock pulses after a start pulse. The start may be a series of pulses or bit pattern, as well as a single rising or falling pulse edge. Furthermore, the signature generator can be triggered off of a parallel bit stream and can be configured to generate a signature from a parallel bit stream. The ability to choose the length of digital signal that is characterized enables a test technician to examine various portions of a digital signal to see when a fault is occurring.

DESCRIPTION OF THE DRAWINGS

FIG. 1 shows a simplified block diagram of a preferred embodiment of the present invention.

FIGS. 2A and 2B show a preferred embodiment of a signature generator.

FIGS. 3A and 3B show another preferred embodiment of a signature generator.

FIGS. 6A and 6B show a schematic diagram of a data acquisition controller and a data handling controller.

DETAILED DESCRIPTION OF THE PREFERRED EMBODIMENT

Figure 4A:
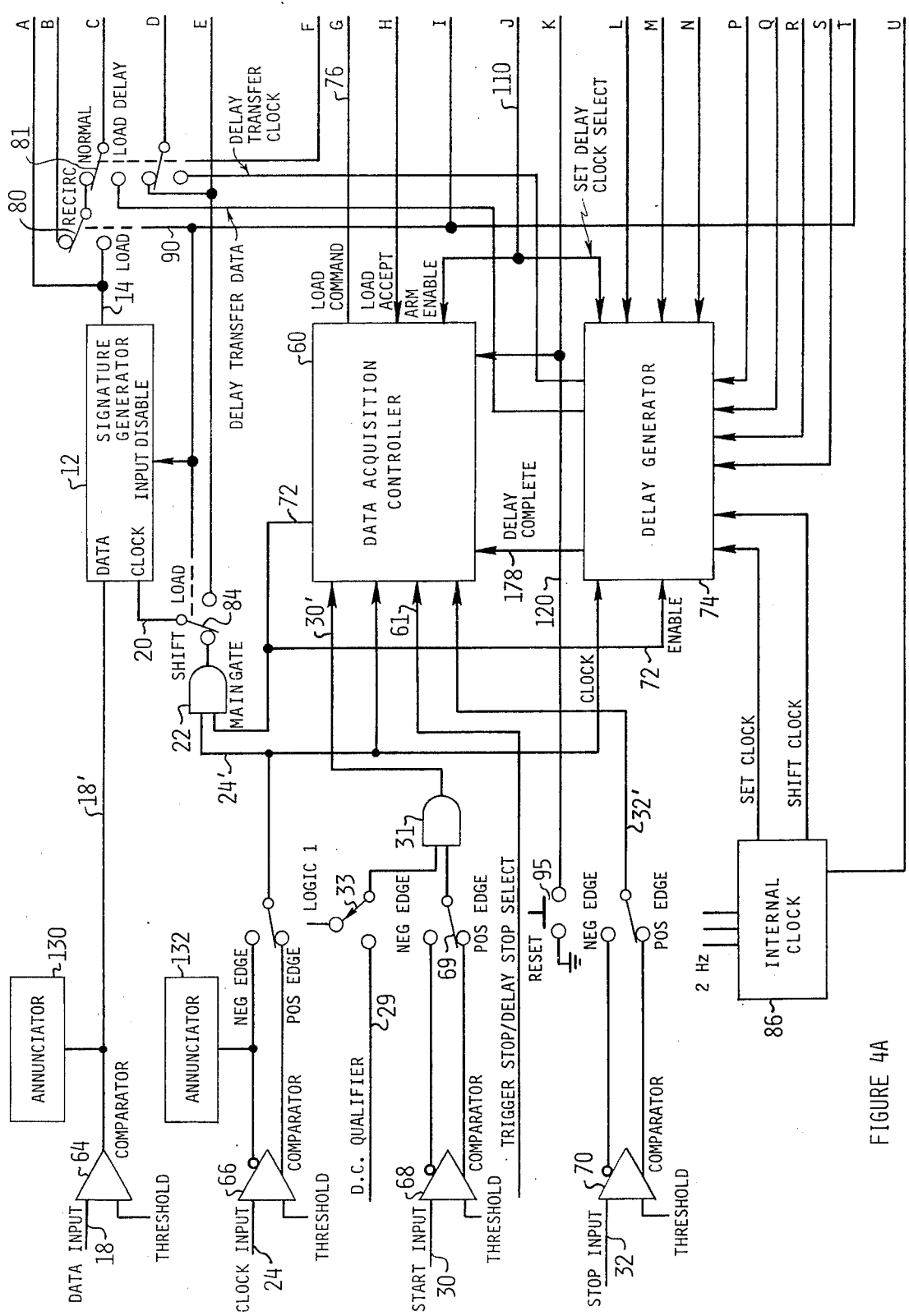
FIGS. 4A and 4B show a more detailed block diagram of the apparatus illustrated in FIG. 1.

FIG. 1 shows a simplified block diagram of a test apparatus 10 using a signature generator 12. The signature generator is shown as implemented in the form of a feedback shift register (discussed in further detail below) having an output 14 connected to a display 16. An input 18 to the signature generator receives a test digital signal from a circuit or system under test. A clock input 20 receives clock pulses from the circuit under test via a gate 22 having an input 24 which may be connected to the circuit under test. A second input 26 to AND gate 22 is connected to a trigger circuit 28 here illustrated as a flip-flop. The flip-flop has a set input 30 and a reset input 32 which can be connected to points in the circuit under test that supply appropriate signals for indicating the beginning and the end of a digital signal for which a signature is to be generated.

Alternatively, start and stop signals can be supplied by other circuits as described in further detail below. When a start appears on input 30, the output of trigger circuit 28 opens gate 22 to allow clock pulses to pass through to the signature generator. During the time gate 22 is open, digital signals appearing on input 18 will cause the generation of a signature. When the stop signal is received on stop input 32, gate 22 will be closed and the signature will be displayed in display 16. The displayed signature can then be compared with the desired signature, which has previously been computed in a similar manner from a circuit known to be operating correctly. Furthermore, signatures can also be generated from circuits having known operational deficiencies so that the person using test apparatus 10 can identify what particular part of the circuit is causing the malfunction.

There are many possible embodiments of a signature generator since a signature generator can be made using many forms of state machines. A suitable form of state machine is an electronic circuit having an internal state which is a function of the input and its own previous internal state and having an output which is a function only of the internal state. (Such a state machine is referred to as a class 3 state machine in Clare, *Designing Logic Systems Using State Machines*, McGraw-Hill, 1973, although it should be noted that a class 4 state machine could also be used.) One particular embodiment of a state machine is a multielement shift register comprising a series of flip-flops tied together with the output of one flip-flop driving the input of the next. The input may be modified according to the internal state of the shift register by combining the input signal with various of the signals appearing on the outputs of flip-flops in the shift register. A preferred embodiment of a feedback shift register for use as a signature generator is shown in FIGS. 2A and 2B. The shift register shown in 20 bits long, that is, it has 20 flip-flops and can therefore contain 20 binary digits. In this feedback shift register the 20th, 17th, 15th and 11th bits are added modulo two to the input and the polynomial thereby implemented may be represented as $D_{20} + D_{17} + D_{15} + D_{11} + 1$. The modulo two addition is effected by exclusive OR gates 40, 42, 44, and 46.

The polynomial implemented in the shift register shown in FIGS. 2A and 2B is known as a maximal length polynomial because it has the largest number of different possible states for the length shift register used, here 20 bits. Such a polynomial is advantageous from the point of view of hardware savings and accuracy in the identification of faults, since the accuracy, A, is a function of the length of the polynomial, N, so that: $A = 2^N$. Other nonmaximal length polynomials can be implemented to achieve a signature for a data stream also. The implementation of polynomials to generate a word representing serial and parallel data streams is discussed in an article entitled "Implementation of a Parallel Cyclic Redundancy Check Generator" by Karl M. Helness in *Computer Design*, March 1974, pages 91–96.

FIGS. 3A and 3B show an alternative embodiment of the polynomial generator implemented in FIGS. 2A and 2B. Three extra flip-flops, 50, 52, and 54 have been added to provide a look-ahead feature to speed up the generation of the signature. Therefore the feedback taps are connected to the output two flip-flops prior to the feedback taps shown in FIG. 2 since each feedback signal passes through either flip-flop 50 or 52 and 54.

The result, however, is the same as that obtained with the circuit in FIG. 2.

Figure 4B:
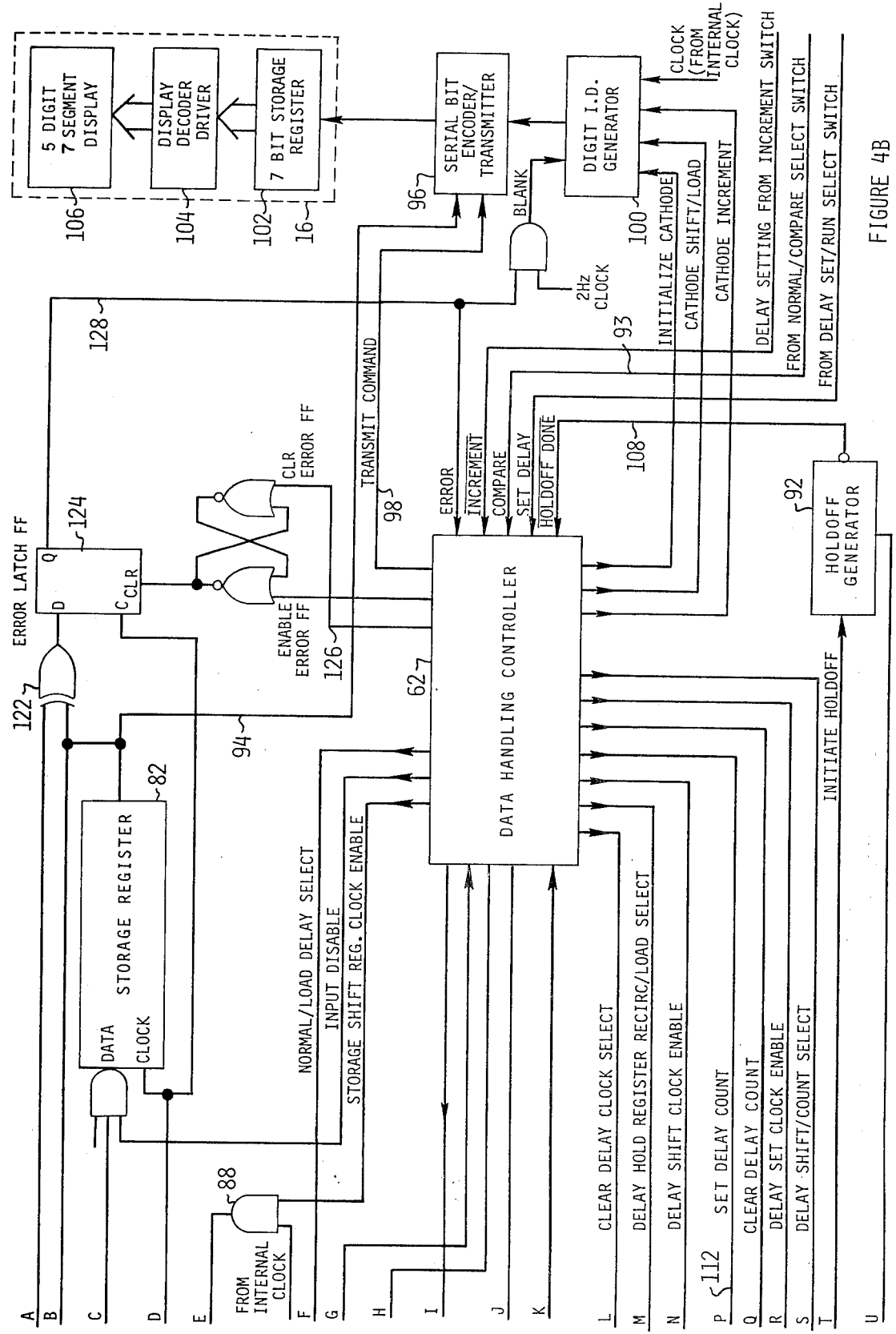

FIGS. 4A and 4B show a more detailed schematic diagram of a preferred embodiment of the present invention. The operation of the circuit is governed by two control circuits — a data acquisition controller 60 and a data handling controller 62. The data acquisition controller is connected to an input of main gate 22 to control the supply of clock pulses to the signature generator 12 from clock input 24. Start input 30 and stop input 32 are connected to data acquisition controller 60 which performs, among others, the functions of trigger circuit 28 in FIG. 1. The data, clock, start and stop inputs are each connected to comparators 64, 66, 68 and 70, respectively; and each comparator has a second input which may be connected to a selectable threshold voltage or current level depending upon the type of logic being tested. In addition, each of the comparators 66, 68 and 70 have both a normal and an inverted output so that either the negative going or positive going edge of the pulse on the respective comparator input may be used for clocking or triggering. Prior to starting the generation of a signature, the signature generator shift register is filled with all zeros as will be discussed further below. Before a start pulse is received on start input 30, data acquisition controller 60 is in its arm state, and a signal on the main gate control output 72 causes the main gate to be closed so that not clock pulses are being received by the signature generator. The data acquisition controller will open the main gate when the start input changes state, that is, changes from high to low or low to high in signal value, depending upon the output of comparator 68 that has been selected by switch 69. When the main gate is opened, each clock pulse on input 24 will cause the feedback shift register to shift in another bit of data appearing on data input 18 and to combine this bit with bits representing the present state of the shift register, as described above.

The signature will continue to be generated in the above-described manner until a stop signal causes the data acquisition controller to close the main gate 22. Two different means of providing the stop signal are provided for in the embodiment shown in FIG. 4. A change in the state of the signal on stop input 32 can be used to trigger the closing of main gate 22 or a signal from delay generator 74 may be used for the same purpose. The signal used to close the main gate is selected by a trigger stop/delay stop select input 61 to the data acquisition controller. At the same time that the main gate is closed, a load command will be given to data handling controller 62 on line 76 so that the signature generated in signature generator 12 can be displayed in display 16. The delay generator 74 is simply a presettable counter. The delay generator determines the number of clock periods the main gate will stay open after the start has been received. The delay generator is enabled via the enable line 72 when the start signal is received by data acquisition controller 60 and clock inputs are received from clock input 24 via line 24'.

The signature generator 12 is connected via an output line 14 and switches 80 and 81 to a storage register 82. When data handling controller 62 receives a load command on line 76 it changes position of switch 80 to connect the output of the signature generator to the data input of storage register 82. At the same time the clock input 20 of signature generator 12 is switched from the output of the main gate to an internal clock 86 by switch 84. The internal clock signal, generated in internal clock 86, is applied to the clock inputs of both the signature generator 12 and storage register 82 via a gate 88 controlled by data handling controller 62. When data handling controller 62 enables gate 88 it also disables the input to signature generator 12 via line 90 so that the input always sees zeros. Each clock pulse received from internal clock 86 shifts one bit of data out of signature generator 12 into the storage register 62 and shifts a zero into the input of the signature generator. Concurrently with the load command on line 76, a signal on delay shift clock enable line 112 causes a preset count to be transferred to delay generator 74 as explained in greater detail below.

As mentioned previously, 20-bit shift registers are used in the illustrated embodiment. Thus, after 20 clock pulses the bits that were in the signature generator will have been shifted into the storage register and the signature generator will be filled with zeros in preparation for generating another signature. The signature, which is the remainder left after the signature generator has operated on the data shifted into it, is now stored in storage register 82. During the time the signature is being shifted into the storage register, a hold-off generator 92 prevents data handling controller 62 from giving an arm enable signal to the data acquisition controller, this preventing the initiation of the generation of another signature before the transfer is complete. Hold-off generator 92 is simply a preset counter with a fixed preset count long enough in duration to allow the transfer to be completed. Hold-off generator 92 is connected to internal clock 86 and thus time by the same source that effects the transfer of the signature.

After the transfer is completed, switches 80 and 84 are returned to their recirculate and shift positions respectively. At times other than the time during which data is being transferred from signature generator 12, output 94 of storage register 82 is connected back to its data input via switches 80 and 81. The information in this shift register is caused to circulate by applying clock signals from internal clock 86 to the storage register clock input via gate 88. While the data is circulating in the storage register, it is also transferred to a serial bit encoder/transmitter 96 which transmits the signature in bit serial, digit serial fashion. Data handling controller 62 initiates the transfer of information from storage register 82 to the display by enabling the serial bit encoder/transmitter via line 98 and at the same time causing digit identification generator 100 to generate a digit identification code before each digit of the signature to cause display 16 to display the digits of the signature in the proper order.

It is advantageous to display the signature using a hexadecimal character set by employing one alphanumeric symbol for every four binary digits. Thus 5 alphanumeric symbols can completely represent 20 binary digits. The following conversion scheme is used in the preferred embodiment, although it will be understood that other character sets can be employed.

| HEXADECIMAL CHARACTER SET | |
| --- | --- |
| BINARY NUMBER | ALPHANUMERIC SYMBOL |
| 0000 | 0 |
| 0001 | 1 |
| 0010 | 2 |

-continued

HEXADECIMAL CHARACTER SET

| BINARY NUMBER | ALPHANUMERIC SYMBOL |
| --- | --- |
| 0011 | 3 |
| 0100 | 4 |
| 0101 | 5 |
| 0110 | 6 |
| 0111 | 7 |
| 1000 | 8 |
| 1001 | 9 |
| 1010 | A |
| 1011 | C |
| 1100 | F |
| 1101 | H |
| 1110 | P |
| 1111 | U |

The information from serial bit encoder/transmitter 96 is stored in a 7-bit storage register 102 and transferred to display decoder/driver 104 a digit at a time for display in a 5-digit, 7-segment display 106. Four of the seven bits transferred indicate which character to display and the other three bits indicate the digit position.

Figure 14:
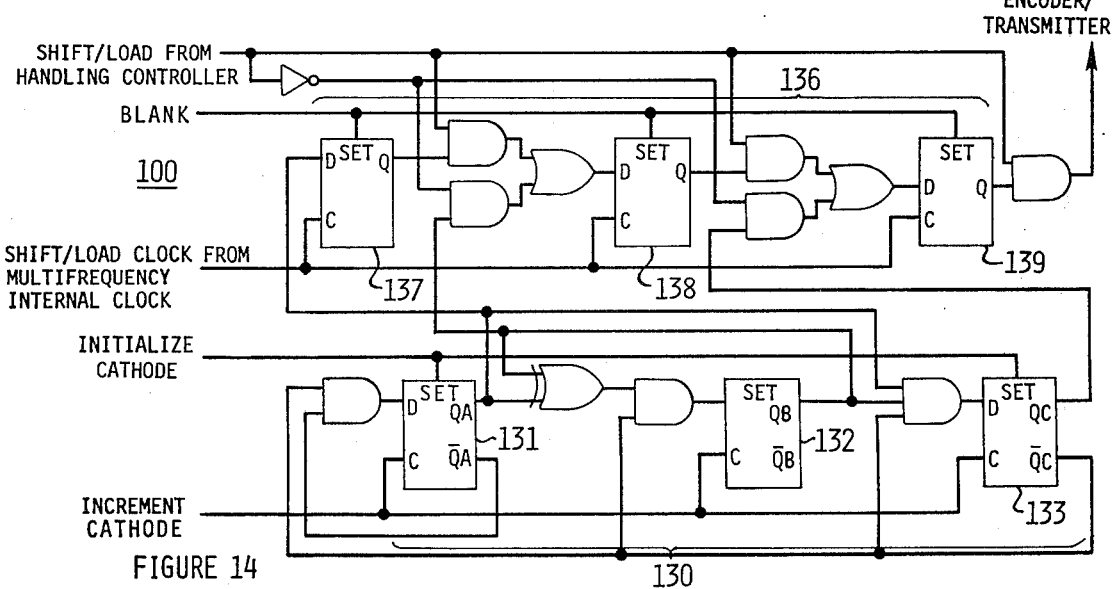
FIG. 14 shows a schematic diagram of a digit indentification generator of the apparatus illustrated in FIG. 4.

The digit identification generator is shown in FIG. 14 as comprising a 5-state counter 130 and a 3-bit shift register 136 for parallel to serial conversion. The counter keeps track of which digit of the signature is being sent to the display, according to the following table:

| COUNTER STATE $Q_C Q_B Q_A$ | DIGIT DISPLAYED |
| --- | --- |
| 0 0 0 | 0 |
| 0 0 1 | 1 |
| 0 1 0 | 2 |
| 0 1 1 | 3 |
| 1 0 0 | 4 |
| 1 1 1 | (BLANK) |

When a new signature has been generated, counter 130 is commanded to the 111 state to momentarily blank the display and then it is sequentially stepped through each of the 5 display states to cause each digit of the new signature to be displayed. The display cycle continues until a new signature is generated. It will be understood by those skilled in the art that other methods of display of the information both serial and parallel are possible and that the above-described method is but one of many of those possibilities.

When hold-off generator 92 has completed its predetermined count, a hold-off complete signal is given to data handling controller 62 via hold-off generator output 108. This hold-off complete signal causes data handling controller 62 to give an arm enable signal on line 110. After the arm enable signal is received by data acquisition controller 60 the cycle will repeat itself when an input is received on start input 30.

Data handling controller 62 has a normal/compare select input 93 by which the user of the test apparatus may select two different modes of operation. The mode called normal is the one described in the preceding paragraphs. The user may also select a mode which allows him to compare the signature generated during successive cycles of operation of the circuit under test. This mode of operation allows the user to check for intermittent or occasional errors that show up in a digital signal as one or more bits that are occasionally but not always wrong. When a signature generated for a given period of operation of the circuit under test differs from the signature generated for the preceding period, the test apparatus will latch on the changed signature and stop, signaling the user that a change has taken place. This allows the user to see what signature has been generated by the digital signal having one or more erroneous bits in it, which may enable him to locate the fault in the circuit under test.

To start the operation of the instrument in the compare mode, the user manually actuates a reset button 95 which places a signal on reset line 120 that causes data acquisition controller 60 and data handling controller 62 to go to their initial states, with the result that data acquisition controller 60 is enabled in the arm state. Upon the receipt of a start signal, the signature generation starts. When a stop signal is received by the data acquisition controller, the signature in signature generator 12 is transferred to storage register 82 as previously described. However, no initiate signal is given to hold-off generator 92 from data handling controller 62. When the transfer is complete data handling controller 62 immediately arm enables data acquisition controller 60 again and a new signature is generated upon the receipt of another start signal.

After the second signature has been generated the signature stored in storage register 82 and the signature just generated are compared bit by bit in an exclusive OR gate 122 connected to the outputs of signature generator 12 and storage register 82. If there is a difference between the two signatures, exclusive OR gate 122 will give a signal to latch 124, which has been enabled via the latch enable line 126 by data handling controller 62. When latch 124 received a signal from the exclusive OR gate, it gives an error signal on line 128 to data handling controller 62; and this signal prevents the data handling controller from giving an arm enable signal to data acquisition controller 60. Thus, the signature generated during the last period which differed from the previously generated signature is stored in the storage register and displayed on the display so that the user may see what the change is. Data handling controller 62 may also send a signal to display 16 to cause it to flash on and off in order to alert the user to the fact that a change has taken place. The user may start another measurement sequence by pushing the reset button.

Annunciators 130 and 132 may be connected to the outputs of comparator 64 and 66 respectively to let the user know that data and clock signals are being received on the respective inputs. The annunciator may be a simple amplifier with a light or a logic probe circuit as described in U.S. Pat. No. 3,543,154 by G. B. Gordon issued Nov. 24, 1970. These annunciators can also be used to warn the user that the input data is stuck at one or zero.

Figure 5:
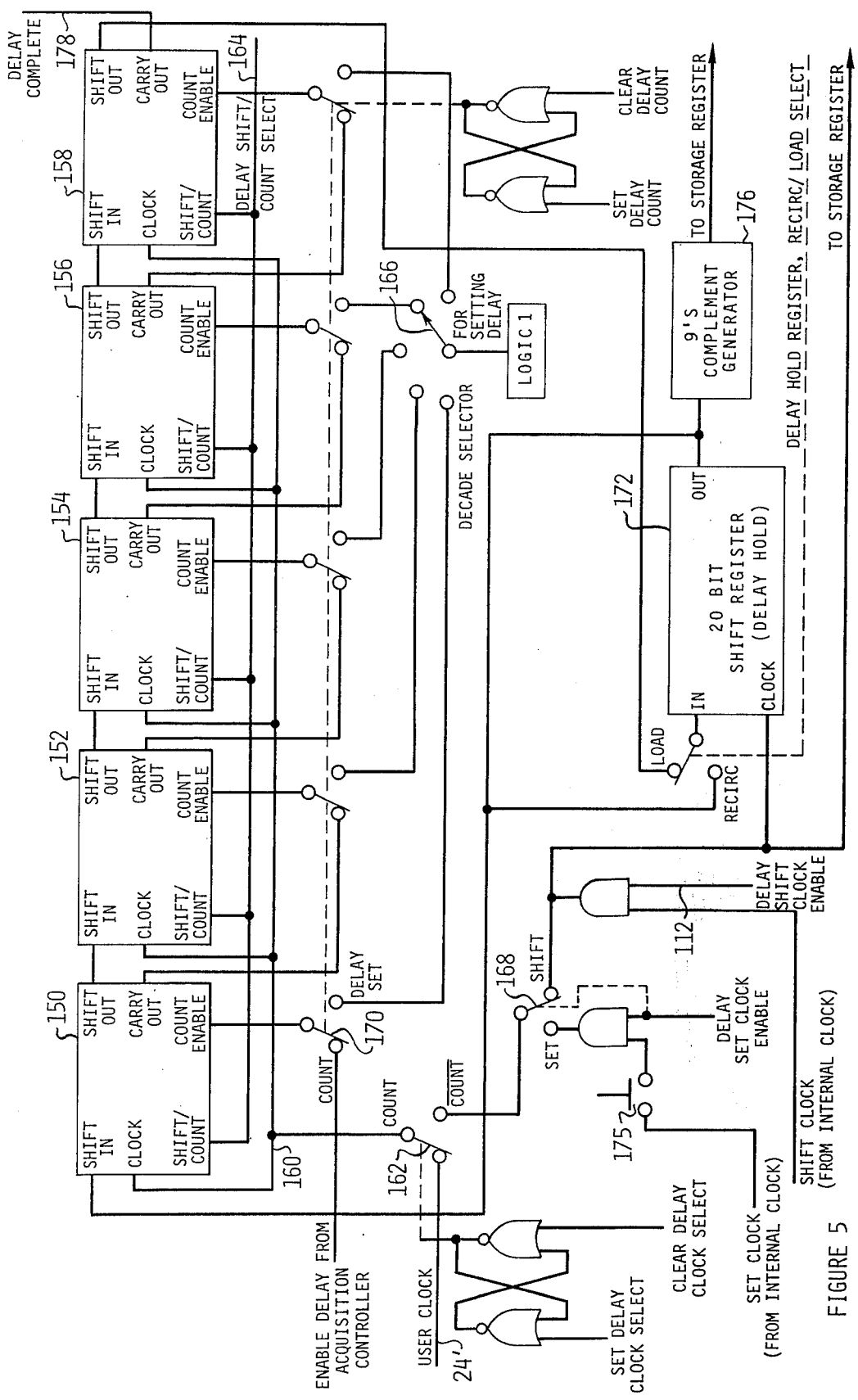
FIG. 5 shows a schematic diagram of a digital delay generator.

FIG. 5 shows a more detailed schematic diagram of delay generator 74. As previously stated the delay is generated in a preset counter, and the counter illustrated in FIG. 5 comprises five 4-bit shift register counters 150, 152, 154, 156, and 158. Each of these shift register counters has a clock input that is connected to a clock line 160 and this clock line may be connected to the user's clock or the internal clock via switch 162.

Each shift register/counter also has a shift/count input connected to a line 164 and a signal on line 164 determines whether the shift register/counters are functioning as ten-state counters or 4-bit shift registers. When the shift register/counters are in the shift mode, data appearing at the shift input of each of the shift register/counters will be shifted one position to the right for every clock pulse and data in the righthand-most position of each shift register/counter will be shifted out the shift output. When the shift register/counters are in the count mode, they will advance one count for every clock pulse when there is an enable signal on the count enable input. When the shift register counter reaches nine, the highest state, an output will appear on the carry-out output to put a signal on the count enable input of the next higher shift register/counter and enable it to count up by one. The carry-out output 178 of shift register/counter 158, the highest order shift register/counter in the sequence shown in FIG. 5, is used to indicate delay complete since when that carry-out signal appears, the counter comprising the delay generator has counted to its highest state.

The delay generator is set by entering a number respresenting the nine's complement of the desired delay. By starting with the nine's complement of the desired delay, that delay will be achieved when the counter counts up to its highest state. This method of delay generation allows the use of a simple up counter rather than a more complex up/down counter. The delay is actually set a digit at a time by first selecting the decade to be set with the decade selector 166, setting the set shift switch 168 to the set position, setting switch 162 to the count position, and setting the count/set delay switch 170 in the set delay position. The user then pushes set push button 175 and pulses are slowly fed to the clock inputs of the shift register/counters causing the selected counter to change state for each clock pulse.

After each set clock pulse switch 168 is moved from the set to the shift position and the contents of all of the 4-bit shift register/counters are shifted into the 20-bit shift register 172 by 20 shift clock pulses from the internal clock. The shift clock pulses are much closer together so that the shifting operation can be accomplished in between each set clock pulse. After the information from the shift register/counters has been loaded in shift register 172, the information is shifted back into the shift register/counters and also to storage register 82 via nine's complement generator 176. Thus, the delay time being selected by the user is shown in the display so the user can know when to release set push button 175.

Each time the counter selected by switch 166 is incremented it is in the count mode, and then all the shift register/counters are changed to the shift mode for the shifting operation. Once the desired delay has been selected, switch 170 is returned to the count position and shift register 172 stores the desired delay. This delay is transferred into the shift register/counters when a delay shift clock enable command from data handling controller 62 is received on line 112. At the time the delay shift clock enable command is received switch 162 is moved to the shift position and information from shift register 172 is shifted into the shift register/counters.

Figure 6B:
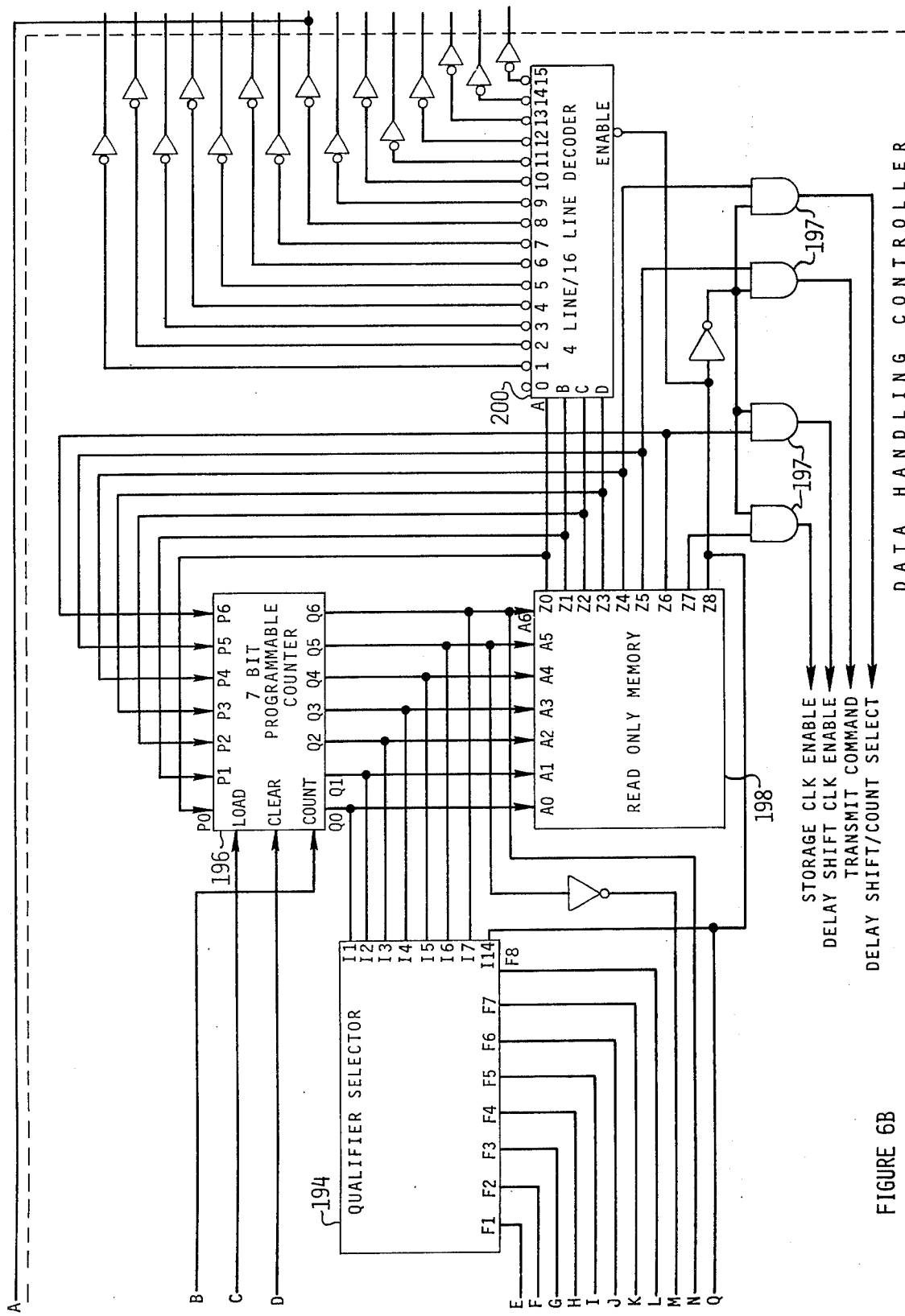

FIGS. 6A and 6B show a more detailed schematic diagram of data acquisition controller 60 and data handling controller 62. The data acquisition controller comprises 4 flip-flops 180, 182, 184, and 186. Each flip-flop is connected to the user clock input via line 24'. In addition flip-flop 184 is connected to the start line 30' and flip-flop 186 is connected to the stop line 32'. The output of flip-flop 186 is disabled by the trigger stop/delay stop select line when the delay stop mode is selected. In that mode the signal on the delay complete line 178 is used as the source of the stop signal. The outputs of gates 188 and 190 connected to flip-flops 180 and 182 provide the output signals from the data acquisition controller.

Figure 15A:
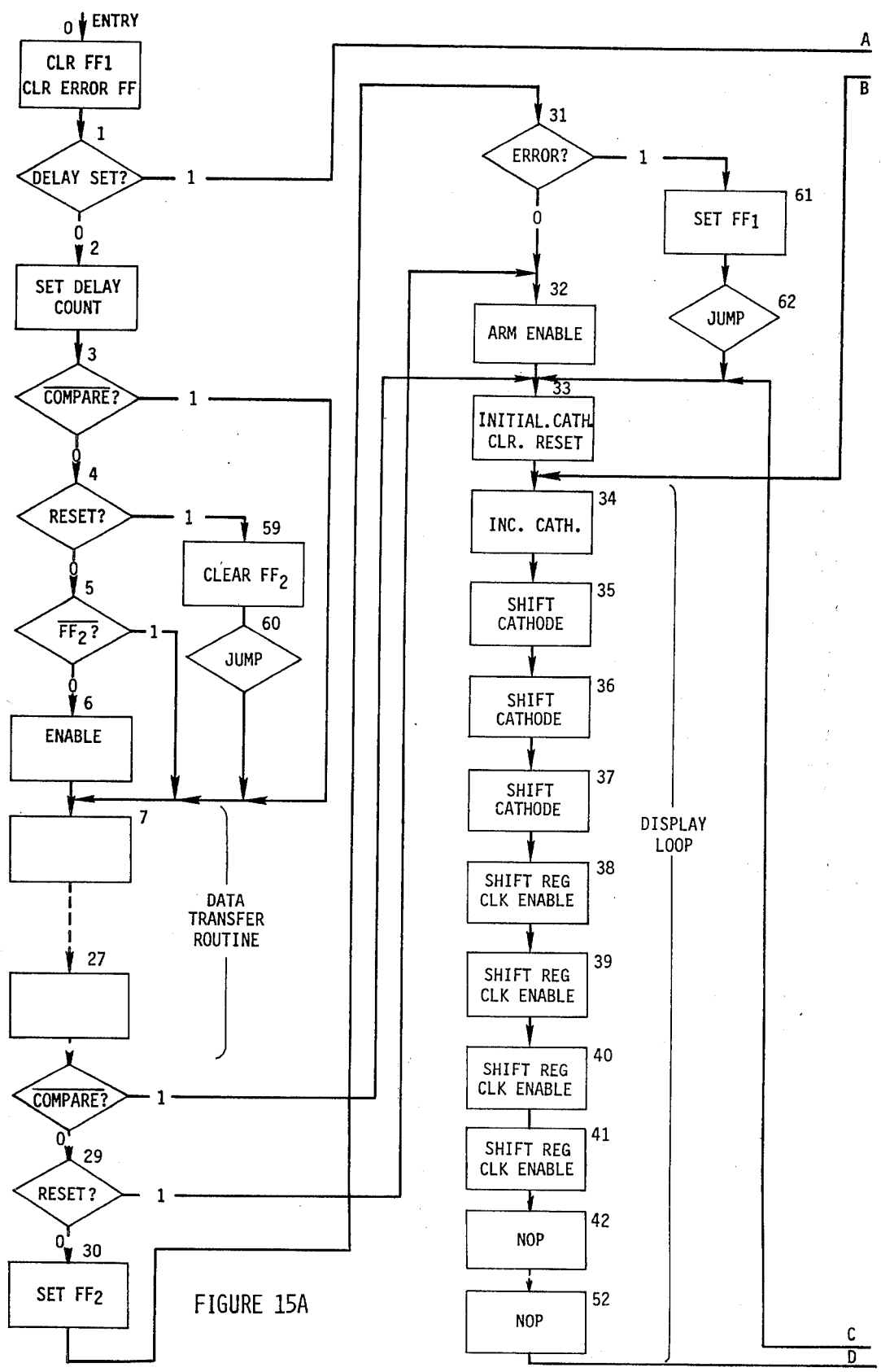
FIGS. 15A and 15B show a state flow diagram for the data handling controller of FIG. 6.
Figure 15B:
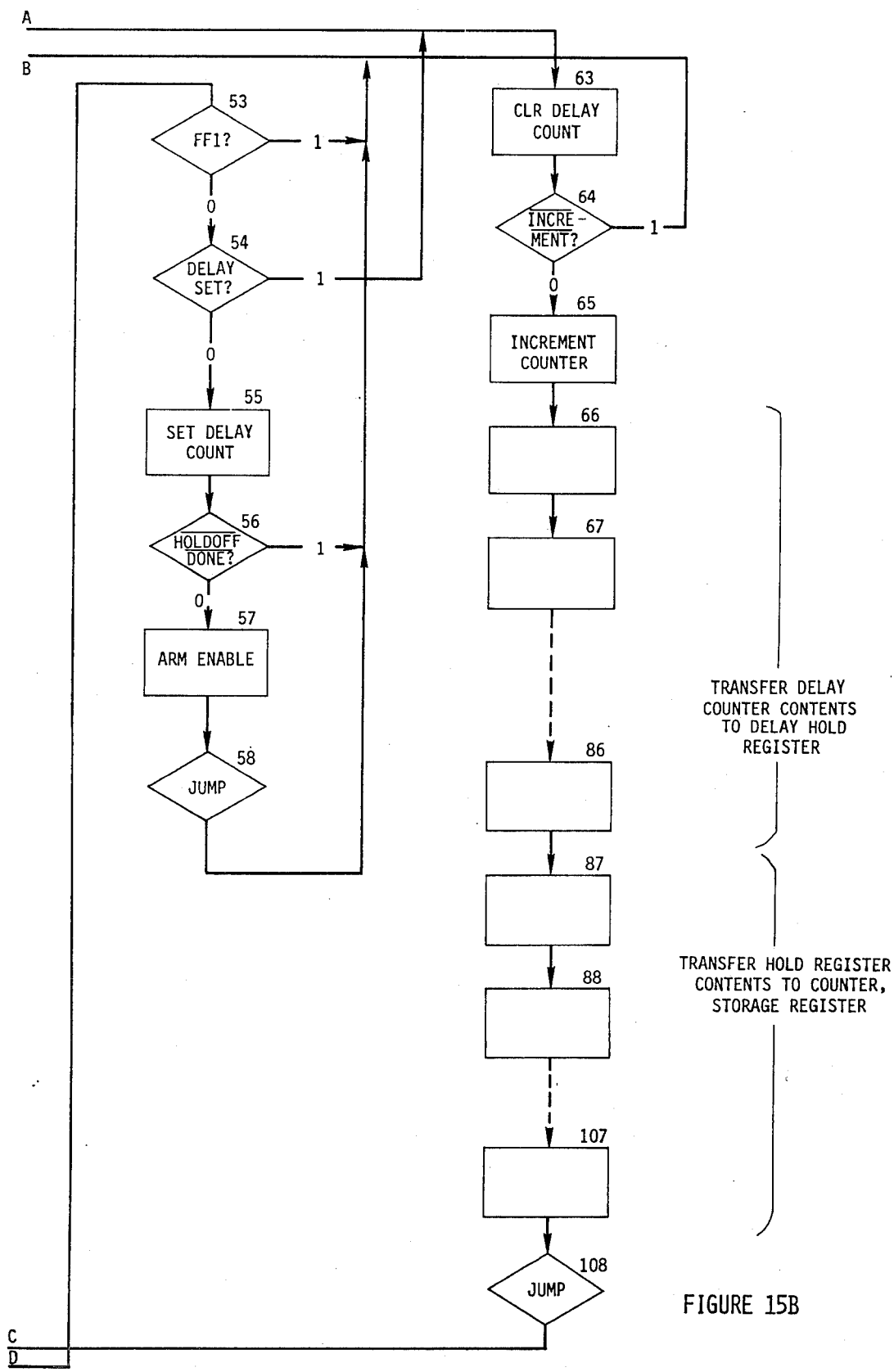

Data handling controller 62 is essentially an algorithmic state machine under the command of a read-only memory 198. The commands on the read-only memory appear on outputs labelled $Z_0$ through $Z_8$ in response to signals appearing on inputs $A_0$ through $A_6$. In the illustrated embodiment the read-only memory is a semiconductor 128-bit by 9-bit array. It will be understood, however, that the command functions implemented in the read-only memory can be implemented by other forms of combinatorial logic. The read-only memory programming bit pattern is shown in Appendix A, and the flow diagram in FIGS. 15A and 15B show the logical sequence of the steps in the data handling controller program.

Inputs $A_0$ through $A_6$ of read-only memory 198 are connected to outputs $Q_0$ through $Q_6$ of a 7-bit programmable counter 196. This counter keeps track of the current state of the data handling controller, which appears on the output of the programmable counter. The next state of the data handling controller is determined by the preset inputs $P_0$ through $P_6$ to the programmable counter as well as the LOAD, CLEAR, and COUNT inputs. Preset inputs $P_0$ through $P_6$ are connected to read-only memory outputs $Z_0$ through $Z_6$, enabling the read-only memory to command the programmable counter to a new state that does not sequentially follow the previous state. Read-only memory outputs $Z_0$ through $Z_3$ are also connected to a 4-line to 16-line decoder 200, which may be, for example, a model SN74154 decoder. The outputs of decoder 200 are connected to various other portions of the test apparatus to command the performance of various functions as shown in Decoder 200 Output Table below:

DECODER 200 OUTPUT TABLE

| Output Number | Function |
| --- | --- |
| 0 | No connection |
| 1 | Acquisition clock load/shift, acquisition input disable |
| 2 | Normal/delay load, store shift register |
| 3 | Enable error FF |
| 4 | Clear error FF, clear FF1, clear delay clock select |
| 5 | Set FF1 |
| 6 | Set FF2 |
| 7 | Clear FF2 |
| 8 | Arm enable, set delay clock select |
| 9 | Clear/Reset, initialize cathode |
| 10 | Cathode shift/load |
| 11 | Increment cathode |
| 12 | Delay register recirculate load select |
| 13 | Set delay count |
| 14 | Clear delay count |
| 15 | Delay set clock enable |

Read-only memory outputs $Z_4$ through $Z_7$ are connected directly to control lines via enabling gates 197. The final read-only memory output, $Z_8$, indicates the type of information available on outputs $Z_0$ through $Z_6$. If $Z_8$ is a logical 0, the information on the other outputs is a control instruction, and the signal on $Z_8$ is then also used as an enable signal to gates 197 and decoder 200 to enable the performance of the control function. If the signal on $Z_8$ is a logical 1, it is a conditional next state which will be used to command the programmable counter to jump to a new state. When $Z_8$ is a 1, the decoder 200 and gates 197 are disabled so that a control function is not performed.

A qualifier selector 194 is also connected to the programmable counter and is used to determine whether a branch in the control program should occur when a conditional next state appears on the output of the read-only memory. As illustrated in FIG. 6, the qualifier selector comprises a programmable logic array which may be implemented, for example, in a National Semiconductor Programmable Logic Array Model DM7575. Inputs $I_1$ through $I_7$ of qualifier selector 194 are connected to outputs $Q_0$ through $Q_6$ of programmable counter 196, and an input $I_{14}$ of qualifier selector 194 is connected to output $Z_8$ of the read-only memory. Qualifier selector 194 also has outputs $F_1$ through $F_6$ which are connected to a logic array 195 comprising a plurality of AND gates connected to an OR gate. In logic array 195, the output signals from the qualifier selector are combined with other signals from the test apparatus indicating various statuses or the completion of various functions as indicated by the labels on these lines in FIG. 6. The relationship of output signals to input conditions for the qualifier selector are shown below in the Qualifier Selector 194 Output Table.

above. As soon as this load command is given to the programmable counter, it is also returned via line 202 to the data acquisition controller to clear the command so that the data handling controller program can start.

Data handling controller 62 also includes a reset latch 193. This latch is a flip-flop which receives the reset signal from switch 95 in FIG. 4A. The reset signal forces the data acquisition controller to its load command state by clearing flip-flops 180 and 182 and also disables the data input of storage register 82 so that when data transfer shift pulses occur, the storage register is forced to all zeros, which will make all zeros appear on the display. Because the load command signal has been given to the data handling controller, it is also ready to start at the beginning of its program.

Two status flip-flops are also included in the data handling controller for operation in the compare mode. Status flip-flop 1 is set when an error signal is received from error latch 124 so that an arm enable signal is not sent to the data acquisition control. Status flip-flop 2 is set when reset button 95 is pushed to avoid an invalid error signal during the reset.

Figure 7:
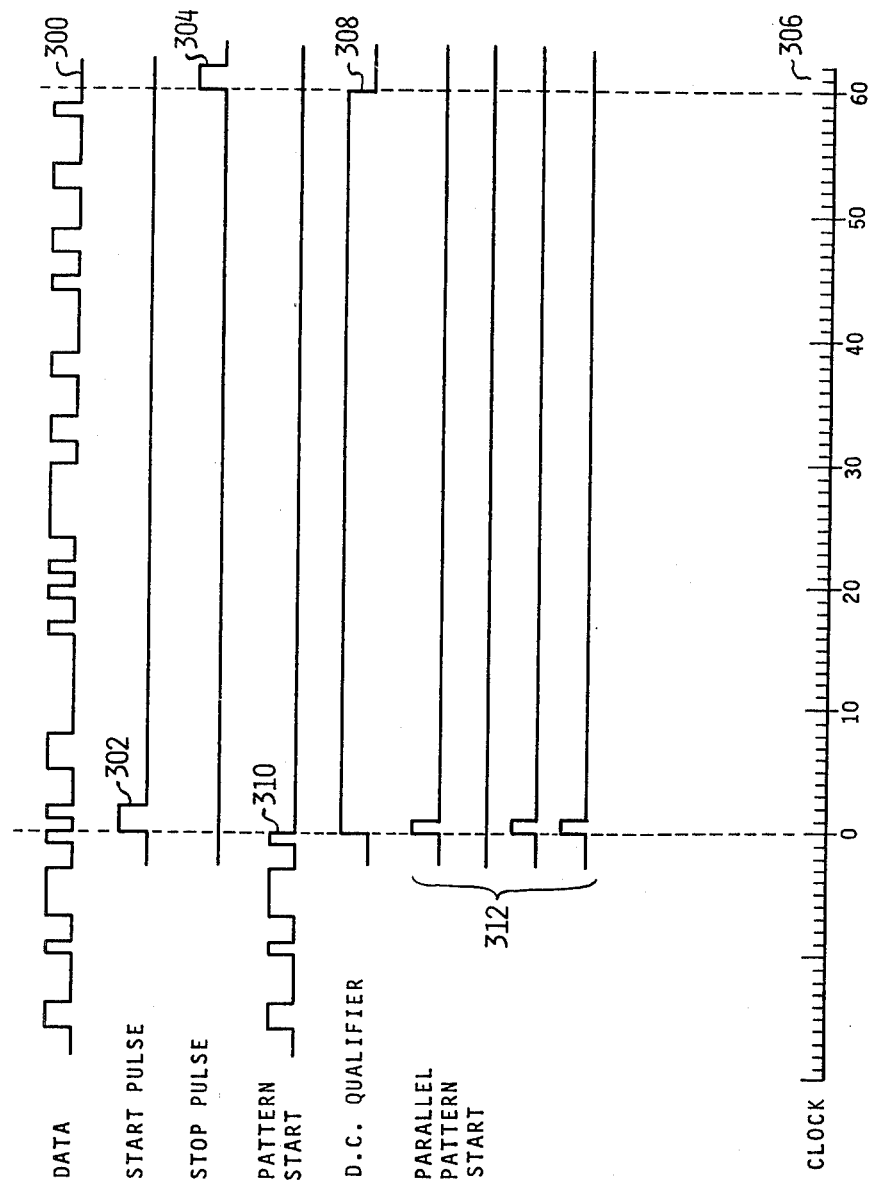
FIG. 7 shows a comparison of triggering pulses.

FIG. 7 shows a diagram of various logic signals illustrating a number of ways of starting and stopping the generation of a signature for a data stream. The line labelled DATA shows an example of a digital signal or

QUALIFIER SELECTOR 194 OUTPUT TABLE

| | |
|---|---|
| $F_1 = I_1 \bar{I}_2 I_3 I_4 I_5 \bar{I}_6 \bar{I}_7 I_{14} + \bar{I}_1 I_2 I_3 I_4 I_5 I_6 \bar{I}_7 I_{14}$ | DELAY SET OPERATING MODE |
| $F_2 = I_1 I_2 I_3 I_4 I_5 \bar{I}_6 \bar{I}_7 I_{14} + \bar{I}_1 I_2 I_3 I_4 I_5 I_6 \bar{I}_7 I_{14}$ | COMPARE MODE |
| $F_3 = \bar{I}_1 \bar{I}_2 I_3 I_4 \bar{I}_5 \bar{I}_6 \bar{I}_7 I_{14} + \bar{I}_1 \bar{I}_2 I_3 I_4 I_5 I_6 \bar{I}_7 I_{14}$ | RESET |
| $F_4 = I_1 \bar{I}_2 I_3 I_4 \bar{I}_5 \bar{I}_6 \bar{I}_7 I_{14}$ | STATUS $FF_2$ |
| $F_5 = I_1 I_2 I_3 I_4 \bar{I}_5 \bar{I}_6 \bar{I}_7 I_{14}$ | ERROR |
| $F_6 = I_1 \bar{I}_2 I_3 I_4 I_5 \bar{I}_6 \bar{I}_7 I_{14}$ | STATUS $FF_1$ |
| $F_7 = \bar{I}_2 I_3 I_4 I_5 I_6 \bar{I}_7 I_{14}$ | HOLDOFF DONE |
| $F_8 = I_2 I_4 I_5 I_6 \bar{I}_7 I_{14} + I_3 I_4 I_5 I_6 \bar{I}_7 I_{14} + I_3 I_4 \bar{I}_5 I_6 \bar{I}_7 I_{14} + I_5 I_6 \bar{I}_7 I_{14}$ | JUMP (FORCED BRANCH) |

The output of logic array 195 is connected to a LOAD input of programmable counter 196. When the signal on the LOAD input is a logical 0, the programmable counter will increment one count every time a pulse is received on the COUNT input. This COUNT input is connected to the internal clock 86 shown in FIG. 4A. When the signal on the LOAD input of programmable counter 196 is a logical 1, numbers at the preset inputs $P_0$ through $P_6$ will be loaded into the counter and thus appear on the outputs $Q_0$ through $Q_6$ on the next count pulse. Thus, when a proper branch condition appears, the output of logic array 195 is a logical 1 so that a new address will be loaded into the programmable counter. If a branch condition has not been met, the output of logic array 195 will remain a logical 0 and the programmable counter will increment to the next address.

When a load command is received from the data acquisition controller on line 76, it is stored in a flip-flop 192. The output of this flip-flop is connected to a CLEAR input on programmable counter 196. When a logical 1 signal appears on the output of flip-flop 192, the programmable counter is forced to the 0 state, that is, all zeros appear on outputs $Q_0$ through $Q_6$. This condition sets the data handling controller at the beginning of its program to perform the functions described data stream that may be applied to data input 18. Start input 30 may be connected to a signal source that provides a start pulse 302 that may occur on a different line in the circuit under test. Likewise, the stop input 32 may be connected to another separate line in the circuit under test having a pulse 304 indicating the end of the data sequence for which the signature is to be generated. Alternatively, as discussed above, a pulse corresponding to pulse 304 can be generated by a digital delay generator a predetermined number of clock pulses after the start pulse 302. A series of clock pulses 306, such as would be available from the circuit under test, is shown at the bottom of FIG. 7. As shown in this example the "window" of time during which the signature is computed is 60 clock pulses although the digital delay generator could be set for any number between one and the largest number of digits that can be entered, which is 100,000 in the case of the embodiment illustrated in FIG. 5.

The window for the computation of the signature can also be determined by a D.C. qualifier in conjunction with a start pulse from the circuit under test. The use of a D.C. qualifier to gate the start pulse is illustrated in FIG. 4 where an AND gate 31 is connected to receive both the start pulse and the D.C. qualifier on line 29. When the D.C. qualifier is high, i.e. a logical 1, the AND gate is open and the start pulse is transmitted to the data acquisition controller. A switch 33 is provided so the user can override the D.C. qualifier line by tying one input of gate 31 to a logical 1. A D.C. qualifier could also be connected directly to main gate 22 to hold the gate open during the desired time for the generation of the signature.

Another method of generating a start signal is to use a pattern trigger. This is illustrated in FIG. 7 by the pulse sequence 310 prior to the starting time. Here the trigger pulse sequence is illustrated as being identical to the data stream just prior to the start point. Thus, if the pattern trigger input were connected to the data line the start would occur at the point illustrated since the data sequence would correspond to the desired pattern. It is not necessary, however, for the pattern trigger input to be connected to the data line since the pattern indicating the desired start point could be taken from another line in the circuit under test. The pattern trigger enables the user to look for a particular data sequence or condition in the device under test before starting the generation of the signature. The pattern trigger may also be used to look for simultaneous conditions on several lines in the form of a parallel bit pattern and trigger when those conditions occur, as illustrated by pulses 312 labelled parallel pattern start. In addition, a pattern may be used to generate the stop signal so that the user may, for example, start and stop on particular bit sequences such as instructions in a computer.

Figure 8:
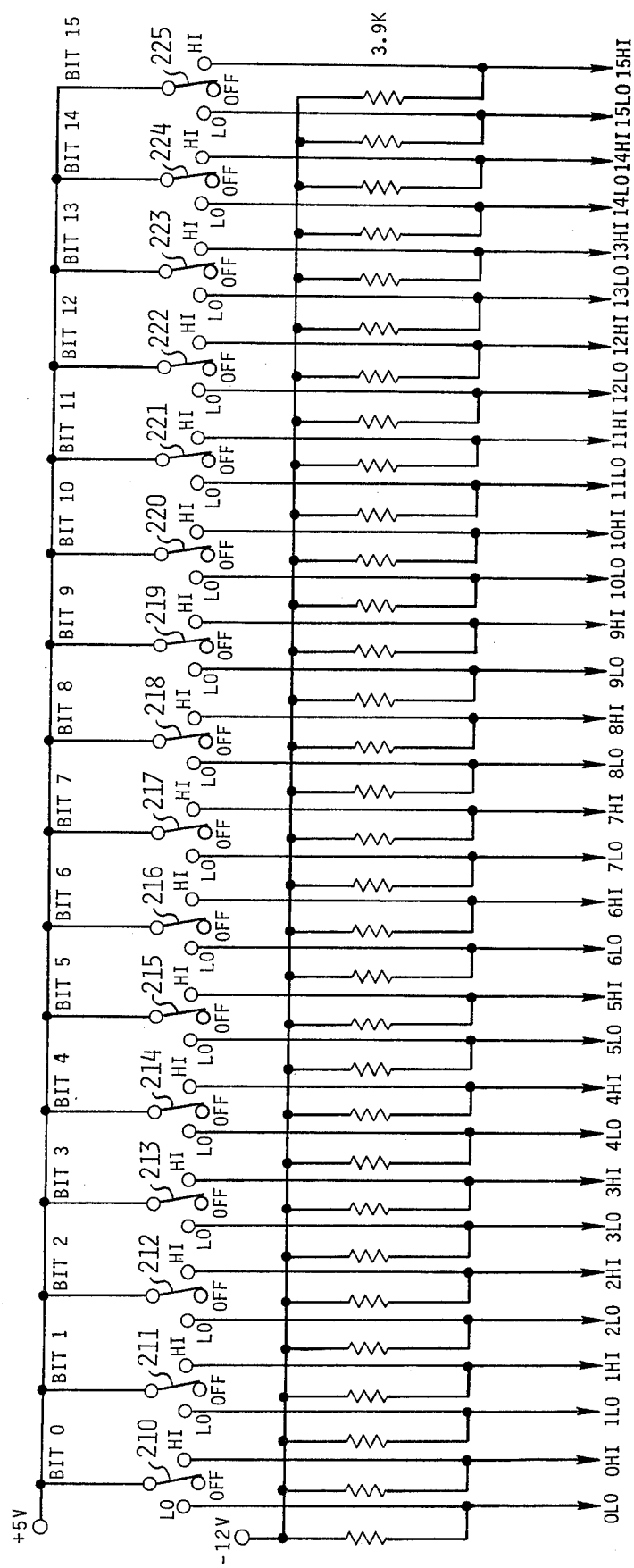
FIG. 8 shows a schematic diagram of a digital pattern selection circuit.
Figure 9A:
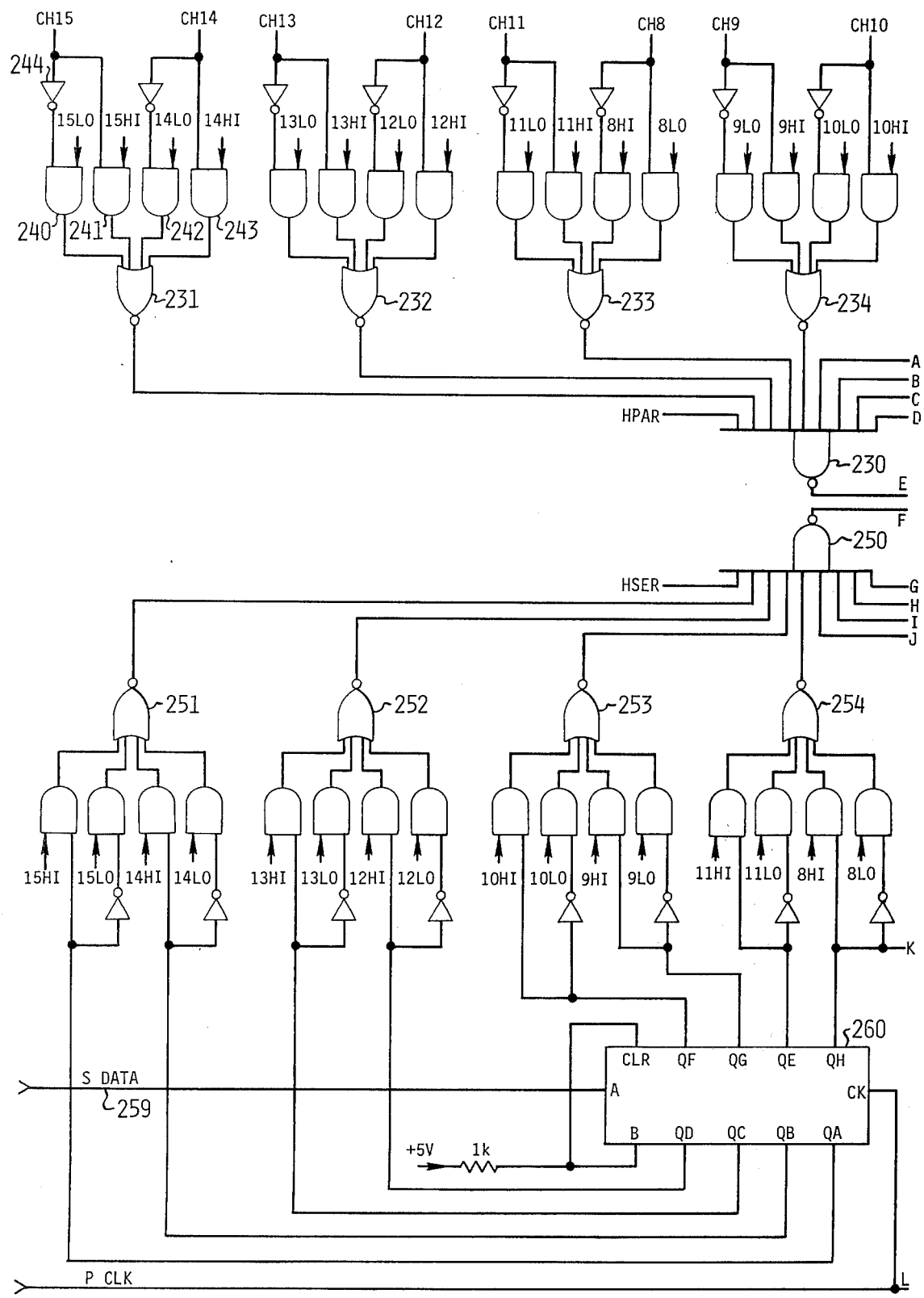
FIGS. 9A and 9B show a schematic diagram of a pattern recognition trigger circuit.
Figure 9B:
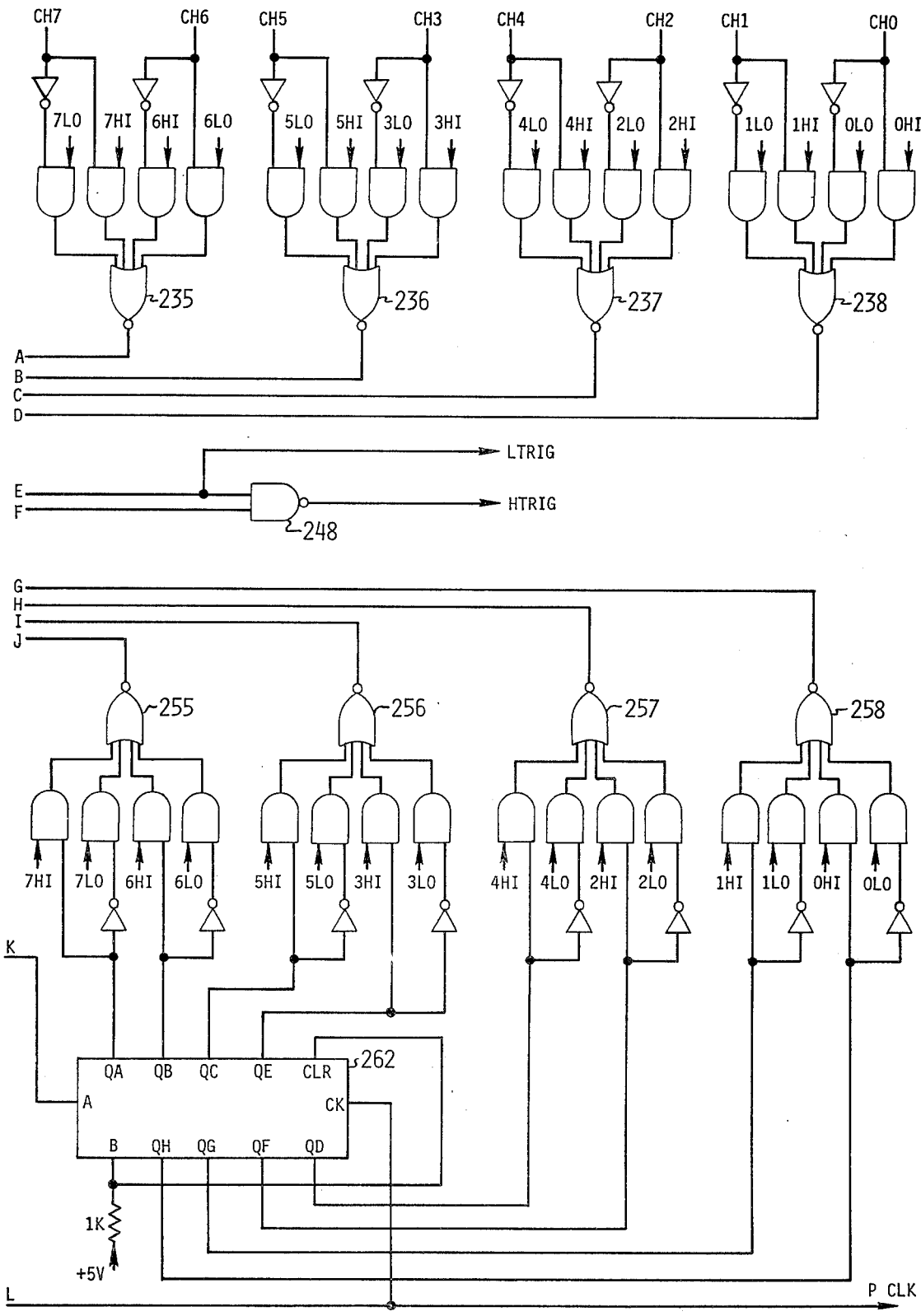
Figure 10:
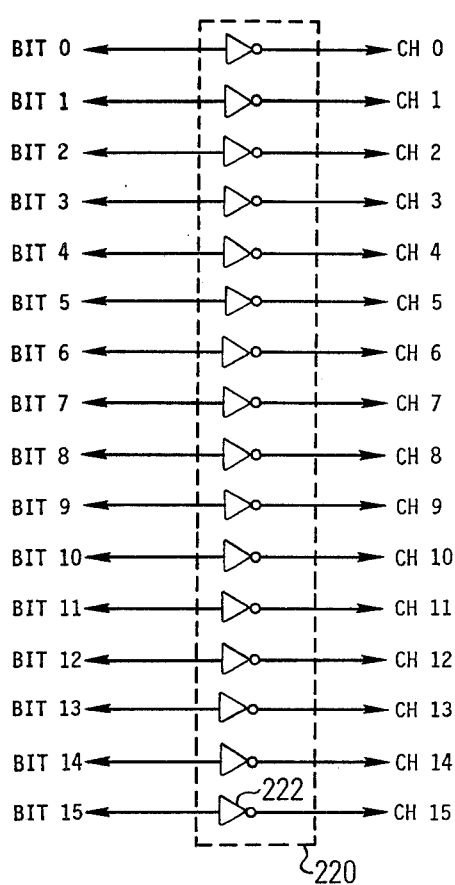
FIG. 10 shows a schematic diagram of a parallel pattern recognition trigger input circuit.

FIGS. 8 through 10 show schematic diagrams of circuitry for implementing a pattern trigger. The pattern trigger circuitry gives a trigger output signal when a predetermined digital pattern is present on the input of the circuitry. FIG. 8 illustrates circuitry comprising switches 210 through 215 used to select the predetermined pattern. Each switch is a three-position switch and defines one of sixteen bits comprising the preselected pattern in the illustrated embodiment. Each bit of the pattern may be specified as either "LO", "HI", or "Don't Care". A Don't Care, the "off" position of each switch, means that either a LO or a HI bit in the signal being used for triggering is acceptable in that particular bit position. By way of example, if the desired pattern for triggering were 10110 then the user would set bit 0 HI, bit 1 LO, bits 2 and 3 Hi and bit 4 LO with the remaining 10 bits set to the off or Don't Care position. Thus, by virtue of the Don't Care positions on the switches, the user can select a trigger word varying in length from one to sixteen bits. A longer predetermined trigger word could also be used, of course, if more switches were provided. Each of the HI and LO switch terminals is connected to a low voltage, here −12 volts, through a resistor to provide a LO signal when the terminal is open. The movable contact of the switch is connected to a higher voltage, here +5 volts so that a HI signal is present on whichever terminal the moving contact is connected to. The outputs of each of the 16-bit positions are indicated in the Figures by the numeral designating the bit position followed by "LO" or "HI".

FIGS. 9A and 9B show the comparison circuitry for determining the presence of a serial or parallel signal having the desired bit pattern. The gates connected to NAND gate 230 comprise the comparators for detecting a parallel bit pattern and the gates connected to NAND gate 250 comprise the comparator for detecting a serial bit pattern. NOR gates 231 through 238 are connected to the input NAND gate 230 along with a line labelled HPAR which carries an enabling signal from a front panel switch to put the trigger circuitry in the parallel mode. Each of the NOR gates 231 through 238 has four AND gates connected to its input, such as AND gates 240 through 243 connected to the inputs of NOR gate 231. Each AND gate is used to compare one of the two possible conditions for each bit in the predetermined pattern that is selected by the switches in FIG. 8. This, 15LO from FIG. 8 is connected to one input of AND gate 240 and 15HI is connected to one input of AND gate 241. These two AND gates also receive signals from one of 16 parallel inputs labelled CH0 through CH15. As illustrated CH15 is connected to the other input of AND gate 241 and also to the other input of AND gate 240 through an inverter 244.

A parallel bit pattern corresponding to the pattern preselected on the switches on FIG. 8 produces a trigger signal in the following manner. For the sake of example assume bit 15 is selected to be HI by switch 225. There will be a logical HI signal on the 15HI output, and a logical LO signal on 15LO output. Parallel pattern trigger data is received through an input probe 220 illustrated in FIG. 10 having 16 parallel inputs each connected to an inverter such as inverter 222 in channel 15. The outputs of probe 220 are connected to the parallel inputs respectively labelled CH0 through CH15 in FIG. 9. Thus the comparators in FIG. 9 compare the complement of the parallel bit pattern with the switch settings respresenting the preselected pattern from FIG. 8. For this reason, when bit 15 at the input of probe 220 is HI, as desired, the signal on channel 15 will be LO. In accordance with the settings of switch 225, 15HI will be HI making one HI and one LO input to AND gate 241. The result will be a LO output from 241 to NOR gate 231. The signal on CH15 is also inverted by inverter 244 connected to AND gate 240; and since 15L will be LO in accordance with the aforementioned setting of switch 225, one input to AND gate 240 will be LO and the other will be HI, therefore making the output of AND gate 240 also LO. In like manner the inputs to all of the gates 231 through 238 will be LO when there is coincidence between the predetermined pattern selected on the switches in FIG. 8 and the data at the inputs to probe 220.

A coincidence condition obtains for either a HI or a LO signal at a particular bit position if the corresponding switch in FIG. 8 has been set to the off or Don't Care position. When the switch is in the off position both the LO and the HI terminal of the switch are at a Lo level and thus at least one input of each of the AND gates corresponding to that bit position will be LO, guaranteeing a LO output from the AND gate.

When the outputs of all of the NOR gates 231 through 238 are HI and the HPAR enabling signal for the parallel mode is also HI, then the output of NAND gate 230 will be Lo, giving a trigger signal output labelled LTRIG. Simultaneously a HI trigger signal labelled HTRIG will also be produced by NAND gate 248.

A pattern trigger can be produced from serial data in a similar fashion to the parallel pattern trigger described above, if the serial data is first converted to parallel form. A serial bit pattern is received on a serial data line 259 from the circuit under test and is connected to a pair of serial to parallel converters 260 and 262. Each of these serial to parallel converters comprises essentially a series of 8-flip-flops tied together as a shift register having outputs labelled $Q_A$ through $Q_H$. The serial data line is tied to input A of serial to parallel converter 260 and output $Q_H$ of serial to parallel converter 260 is tied to input A of serial to parallel converter 262. Each of the serial to parallel converters has a clock input labelled CK which is tied to a clock line PCLK carrying a clock signal from the circuit under test. With each clock pulse the data stream on line 259 from the circuit under test is advanced one bit position through the serial to parallel converters and the series of bits stored in the serial to parallel converters are compared during each clock in the same way that the parallel data stream on channels 0 through 15 was compared with the switch settings from the switches shown in FIG. 8. This comparison is accomplished by connecting the outputs $Q_A$ through $Q_H$ of both serial to parallel converters to the inputs of AND gates connected to NOR gates 251 through 258. The other inputs of each of these AND gates are connected to one of the Hi or LO switch lines from FIG. 8. The outputs of gates 251 through 258 are connected to the input of a NAND gate 250, along with a serial enabling line HSER, and the output of gate 250 is also connected to gate 248 to produce the HTRIG signal. The HTRIG signal may be applied to input 30 in FIG. 1 or input 30' in FIG. 6 to start the generation of a signature.

Figure 13:
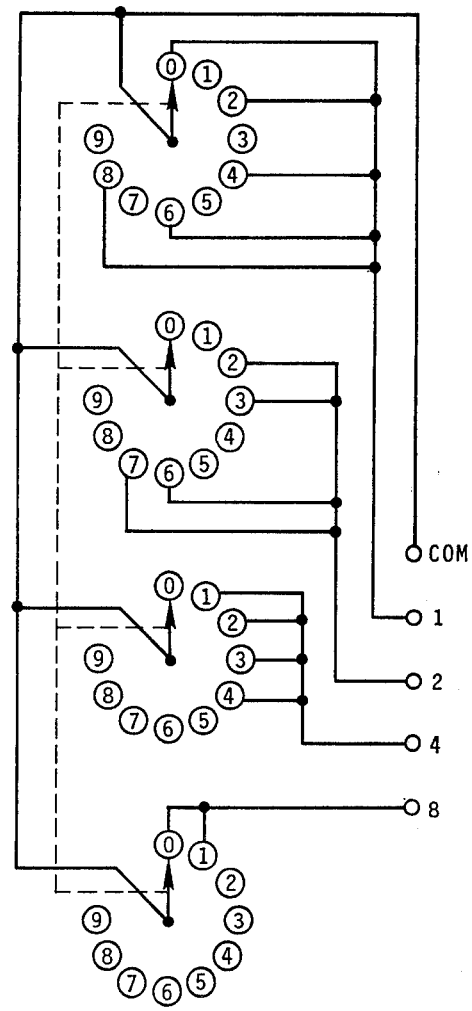
FIG. 13 shows a schematic diagram of a digit selector for the circuit shown in FIGS. 11 and 12.
Figure 11A:
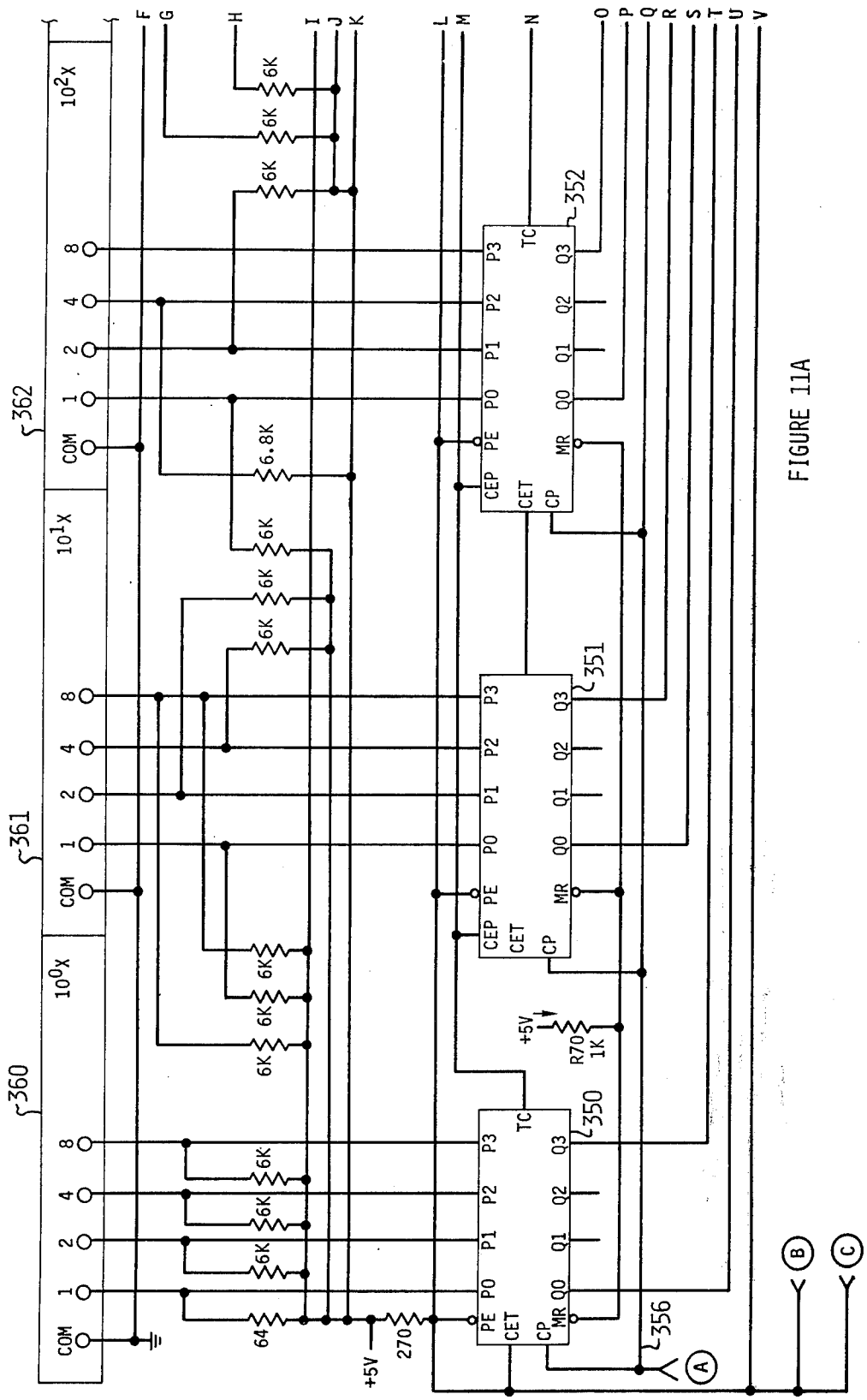
FIGS. 11A and 11B show a schematic diagram of an alternative embodiment of a digital delay generator.
Figure 11B:
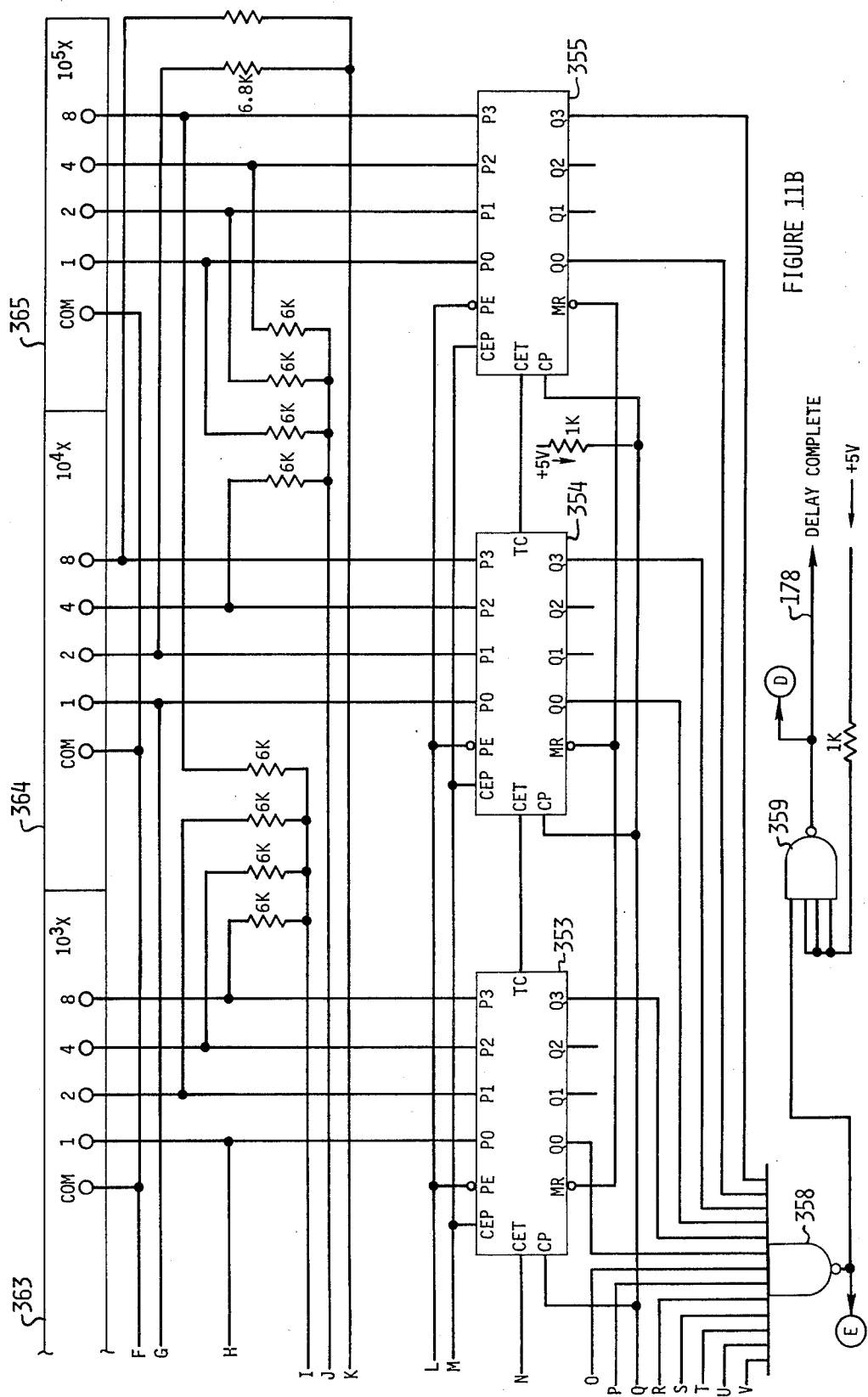
Figure 12:
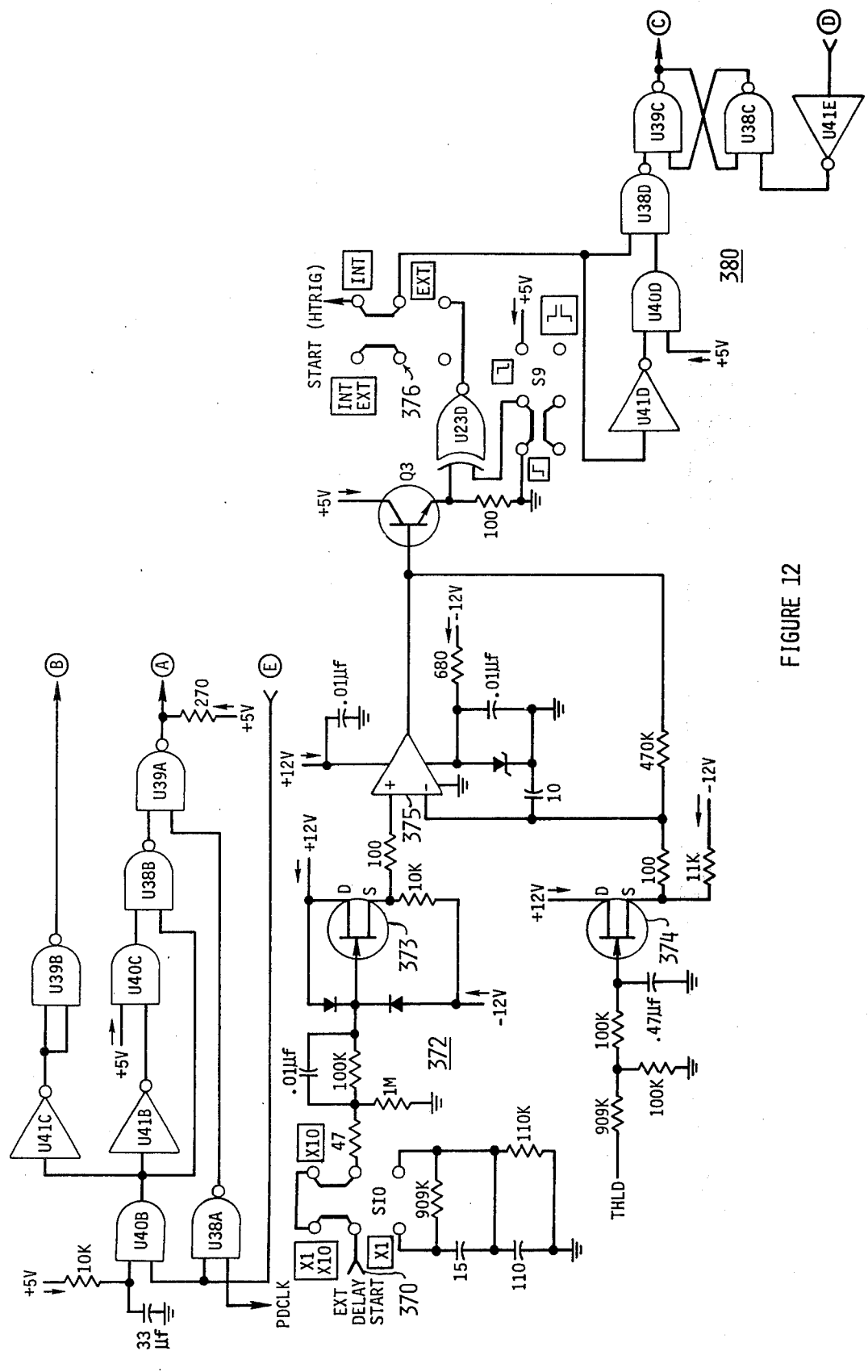

An alternative form of delay generator is shown in FIGS. 11 through 13. The delay signal is produced by presettable counters 350 through 355, such as Fairchild Model 9310, shown in FIGS. 11A and 11B. Each counter has four preset inputs $P_0$ through $P_3$ which allow presetting the counters to any desired number between 0 and 9 application of the nine's complement of the desired number in BCD (Binary Coded Decimal) form to the preset inputs. Each of the presettable counters is connected to one of switches 360 through 365, one of which is illustrated in greater detail in FIG. 13. The switch comprises 4 rotary switch segments one for each binary digit and the movable contact of each switch is connected to a common terminal which in turn in connected to ground as shown in FIG. 11A. When the movable contact is switched to the desired number it connects those inputs $P_0$ through $P_3$ to ground that corresponds to the nine's complement of the number selected. The presettable counters are connected together in serial fashion so that when a counter reaches the count of nine, it enables the next counter to the right to count one on the following clock pulse. Each of the counters is clocked via a line 356 connected to the CP (Clock Pulse) input of each presettable counter and the signal for enabling the next counter is available on the TC (Terminal Count) output of each presettable counter. The TC outputs are connected to CET (Clock Enable, Trickle) inputs which cause each counter to index one count upon the occurrence of a clock pulse when an enable signal on the CEP (Clock Enable, Parallel) inputs is also present.

The user selects a desired delay time via switches 360 through 365 and this information is loaded into the presettable counters when a LO signal appears on the PE (Parallel Enable) input of each counter. When either an internal or external start signal is received by the test apparatus, the signal on the PE input goes high and the counters count upwards from the preset number with each clock pulse. When all counters reach the count of nine, that is, when output $Q_0$ and $Q_3$ on each counter is high, then a delay complete signal is produced. The delay complete signal is produced by NAND gate 358, which has inputs connected to the $Q_0$ and $Q_3$ output of each of the presettable counters. The output of the NAND gate goes low when all its inputs are high, and the output of NAND gate 358 is connected to a NAND gate 359 which inverts the signal to produce the delay complete signal on line 178.

FIG. 12 shows the control circuitry for transmitting clock pulses and start signals to the delay generator circuitry shown in FIG. 11. An external delay signal may be connected to an input 370 for comparison with a preselected threshold signal in a comparator 372 comprising field-effect transistors 373, 374 and an operational amplifier 375. This external delay start signal passes through switch 376 to a latch circuit 380 which stores the start signal during the time the delay generator is counting. An internal start signal may be also used by switching switch 376 to the position shown in FIG. 12 to connect a signal such as HTRIG from FIG. 9 to the delay generator to use the pattern trigger signal to initiate the delay. Another alternative form of digital delay generator is described in U.S. Pat. No. 3,764,783 entitled "Delay Interval Selection for a Digital Delay Generator" by F. D. Terry et al., issued 9 Oct. 1973.

Figure 16:
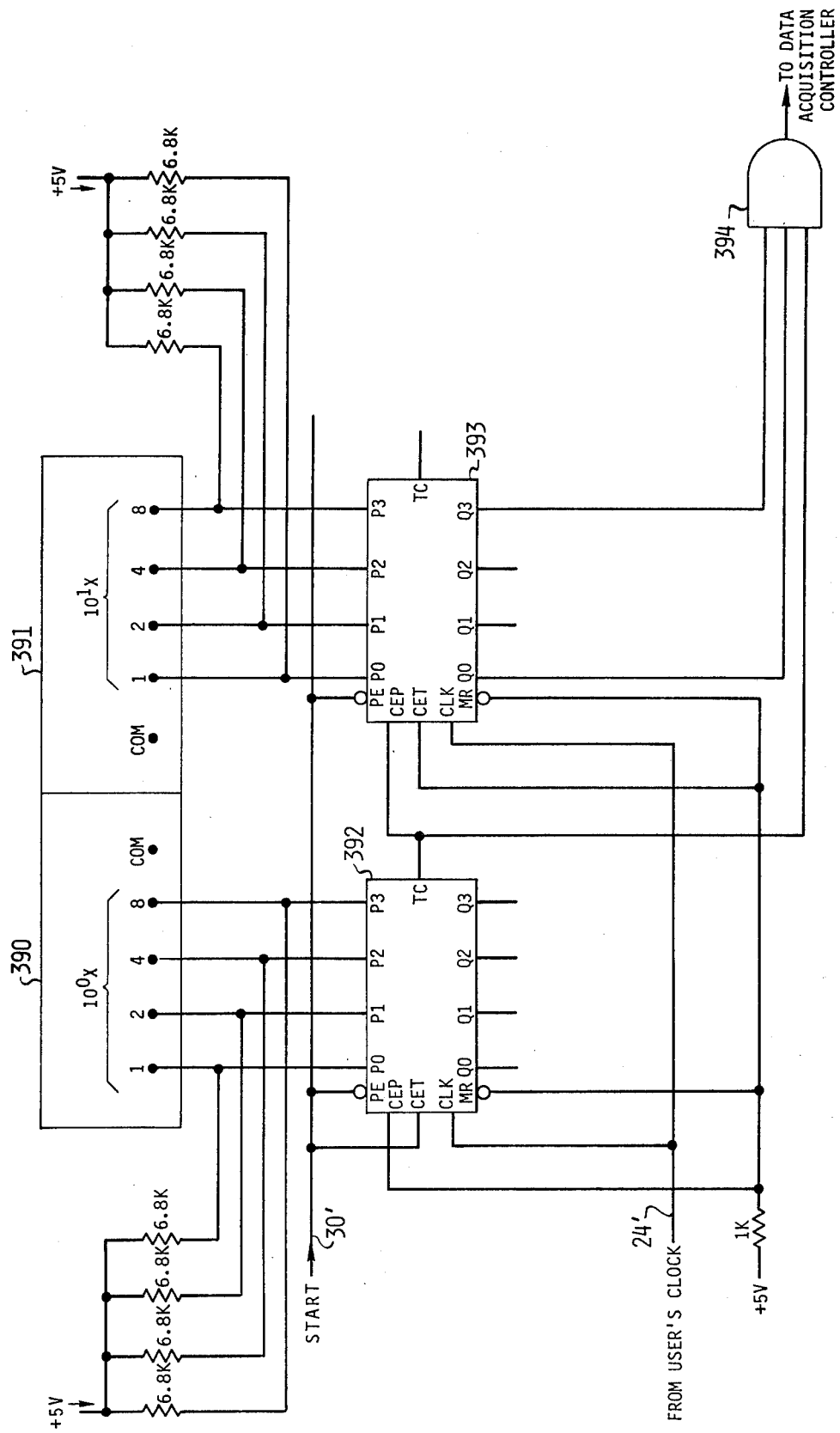
FIG. 16 shows a schematic diagram of a delayed start pulse generator.

A delay generator can also be used to delay the start of the generation of a signature a predetermined number of clock pulses after the receipt of a start pulse. FIG. 16 illustrates a delay generator for delivering a delayed start pulse to the data acquisition controller. Switches 390 and 391, such as the switches illustrated in FIG. 13, are connected to presettable counters 392 and 393, such as those discussed in connection with FIGS. 11A and 11B. The counters are enabled by a start pulse on line 32' and they count up by one count with each clock pulse from the user's clock. When the maximum count is reached, as indicated by a logical 1 on the TC terminal of counter 392 and the Q0 and Q3 terminals of counter 393, a start signal is given by AND gate 394 connected to these terminals.

Figure 19:
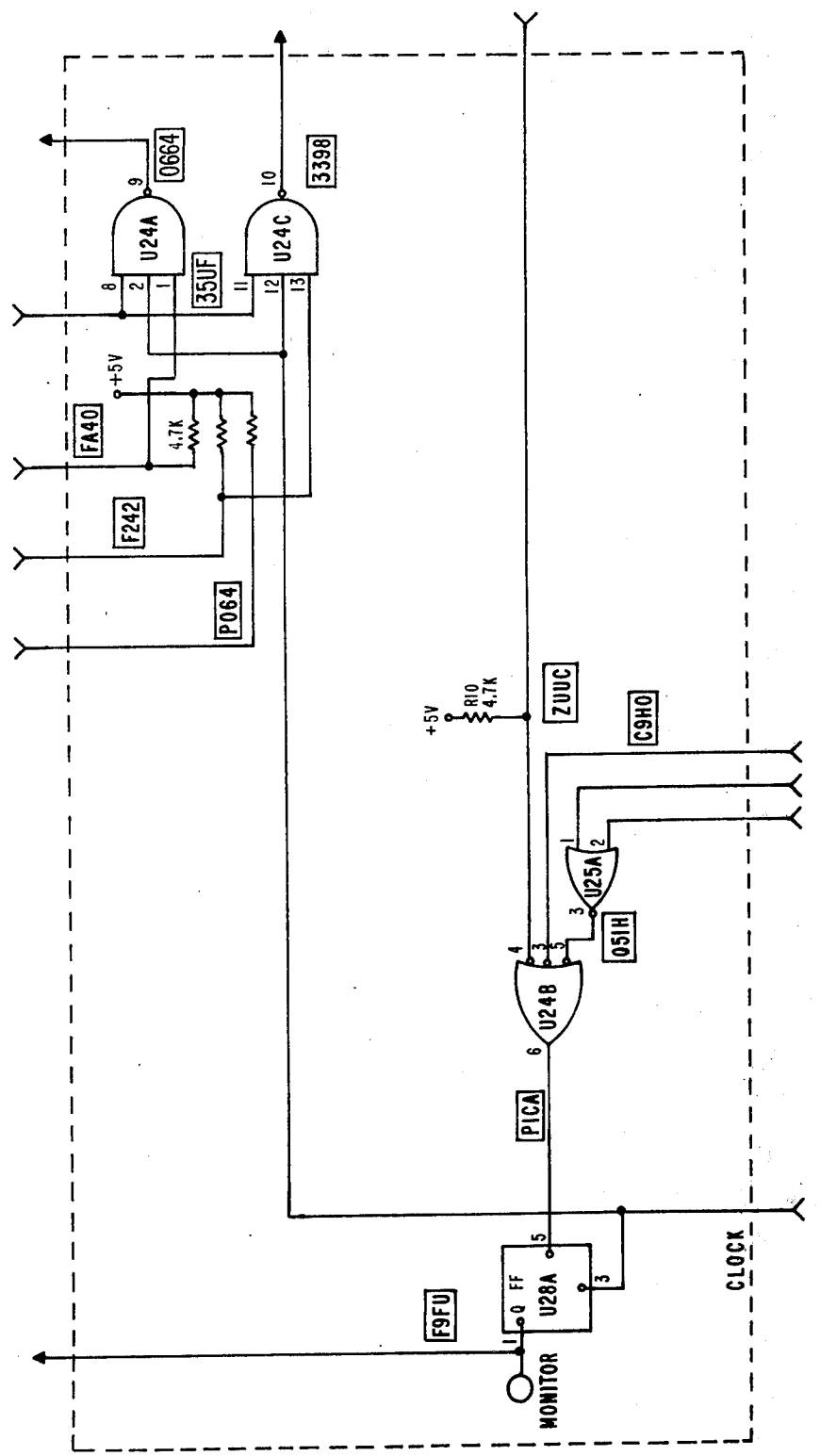
FIG. 19 shows an annotated test circuit diagram.

As previously mentioned, a signature produced by the apparatus described herein can be used to characterize the data streams available at various points in a digital circuit. Because such signatures are easy to read and record for human operators they provide significant advantages in the testing of digital circuits and systems. To facilitate testing of circuits and systems using such signatures, the schematic or block diagrams of a circuit to be tested may be annotated with the signatures of the data streams that should be found at various nodes when the system is operating correctly, as illustrated in FIG. 19. Comparison of a reference digital circuit with a test one may also be effected with the test apparatus in the comparison mode by first measuring a digital signal from the reference circuit and then measuring the digital signal from the same point in the test digital circuit. This may be accomplished by manually controlling the start trigger signal so that one start signal is received when the test apparatus is connected to the reference digital circuit and one when the test apparatus is connected to the test digital circuit. The display will indicate an error when the two signatures differ. Alternatively, reference signatures may be stored in the test apparatus or on paper, magnetic cards, tape, etc. in machine readable form for comparison with generated signatures by the test apparatus.

Figure 17:
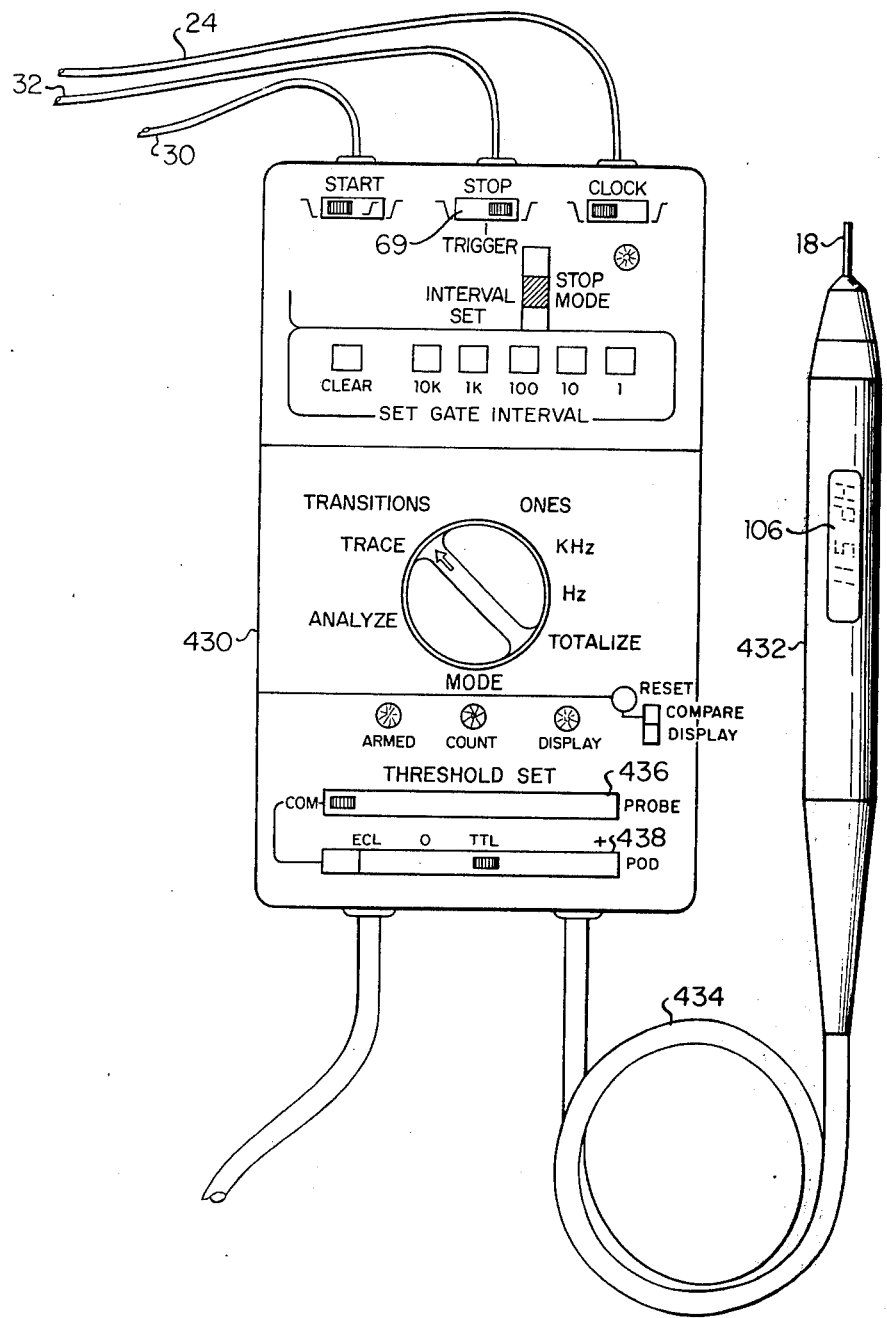
FIG. 17 shows a front panel layout and probe for a test apparatus.

FIG. 17 illustrates one physical embodiment of the test apparatus in which most of the circuitry is contained in a portable housing 430 and both the data input 18 and the five-digit display for displaying signature are housed in a probe 432 connected to housing 430 via a cable 434. Each of the clock start and stop inputs comprise separate cables connected to the housing and each has a switch for selecting the positive or negative edge of the respective pulses such as switch 69. Switches 436 and 438 enable the user to select the proper logic threshold for the type of logic circuitry being tested. The first switch is connected to comparator 64; and the second, to comparators 66, 68 and 70.

Figure 18:
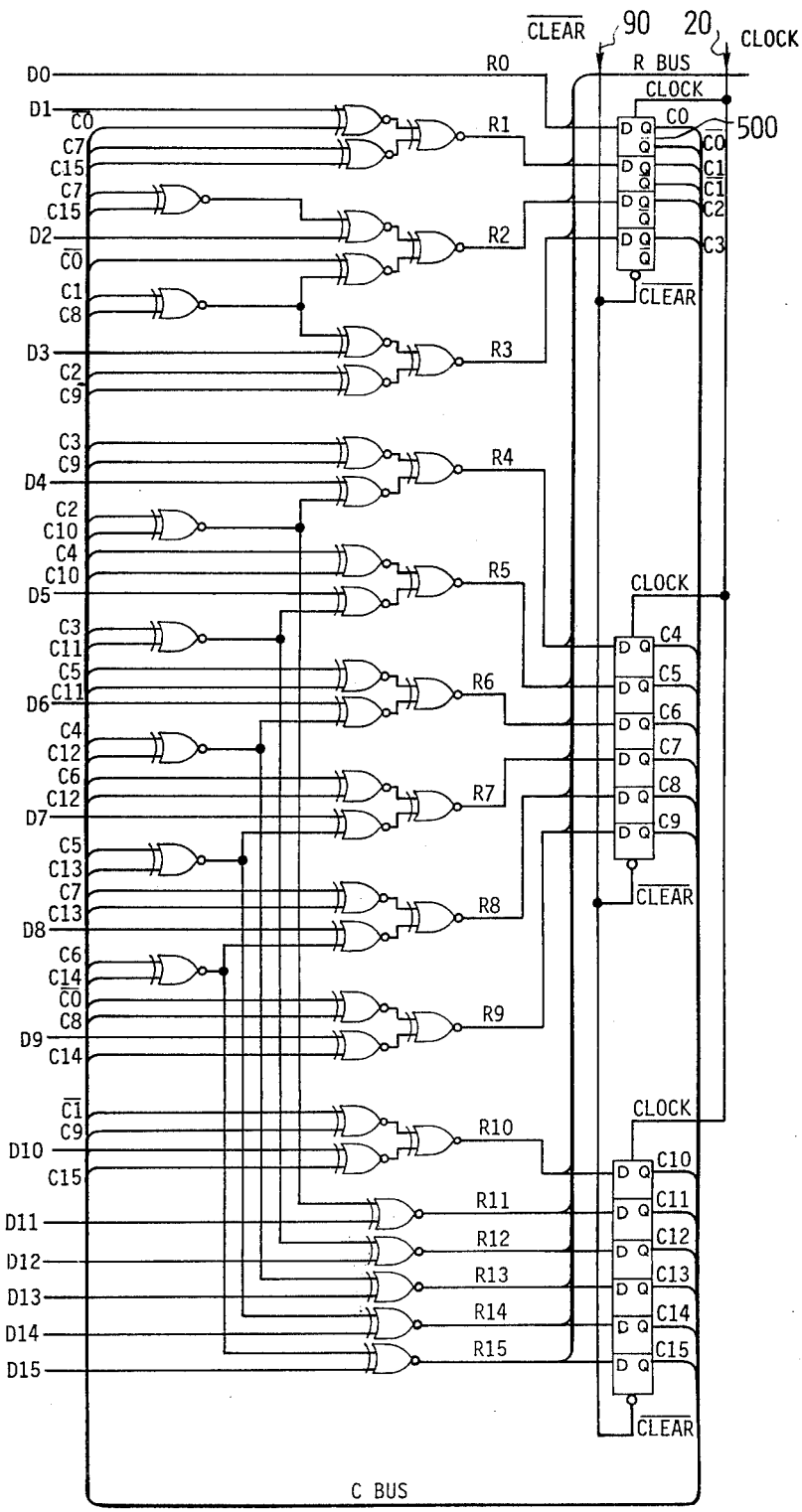
FIG. 18 shows a schematic diagram of a preferred embodiment of a parallel signature generator.

As discussed above, a signature can also be generated for a digital signal that is available in parallel form, and FIG. 18 shows a signature generator for a parallel digital signal 16 bits wide. The input data lines are labelled D0 through D15 and the signature appears on the lines labelled R0 through R15, also, denominated the R-BUS. In the illustrated embodiment, the polynominal $D15 + D8 + D + 1$ is implemented. The input data bits are combined with bits representing the previous state of the generator, i.e. the bits present on the R-BUS during the previous clock period. In response to each clock pulse on line 20, the bits on the R-BUS are stored in 16D flip-flops such as flip-flop 500. The outputs of these flip-flops on lines labelled Co through C15 (C-BUS) represent the previous state of the generator; and they are combined with the bits on Do through D15 in exclusive NOR gates which perform the binary addition. The R-BUS may be connected to a parallel or series storage register such as storage register 82 to which the signature may be transferred when the generation is completed, as in the case of the serial signature generator. The signature for the parallel digital signal can thus be displayed and compared with a previous or a reference signature as described above for a serial digital signal signature.

APPENDIX A

| | READ ONLY MEMORY 198 CODING | | | | | | | | | | | | | | | |
|---|---|---|---|---|---|---|---|---|---|---|---|---|---|---|---|---|
| | ADDRESS | | | | | | | OUTPUT | | | | | | | | COMMENT |
| | $A_6$ | $A_5$ | $A_4$ | $A_3$ | $A_2$ | $A_1$ | $A_0$ | $Z_8$ | $Z_7$ | $Z_6$ | $Z_5$ | $Z_4$ | $Z_3$ | $Z_2$ | $Z_1$ | $Z_0$ | |
| 0 | 0 | 0 | 0 | 0 | 0 | 0 | 0 | 0 | 0 | 0 | 0 | 0 | 0 | 1 | 0 | 0 | ENTRY |
| 1 | 0 | 0 | 0 | 0 | 0 | 0 | 1 | 1 | 0 | 0 | 1 | 1 | 1 | 1 | 1 | 1 | BRANCH TO DELAY SET LOOP |
| 2 | 0 | 0 | 0 | 0 | 0 | 1 | 0 | 0 | 0 | 0 | 0 | 0 | 1 | 1 | 0 | 1 | SET DELAY COUNTDOWN |
| 3 | 0 | 0 | 0 | 0 | 0 | 1 | 1 | 1 | 0 | 0 | 0 | 0 | 0 | 1 | 1 | 1 | BRANCH TO TRANSFER ROUTINE |
| 4 | 0 | 0 | 0 | 0 | 1 | 0 | 0 | 1 | 0 | 0 | 1 | 1 | 1 | 0 | 1 | 1 | BRANCH TO FF2 CLEAR |
| 5 | 0 | 0 | 0 | 0 | 1 | 0 | 1 | 1 | 0 | 0 | 0 | 0 | 0 | 1 | 1 | 1 | BRANCH TO TRANSFER ROUTINE |
| 6 | 0 | 0 | 0 | 0 | 1 | 1 | 0 | 0 | 0 | 0 | 0 | 0 | 0 | 0 | 1 | 1 | ENABLE ERROR FF |
| 7 | 0 | 0 | 0 | 0 | 1 | 1 | 1 | 0 | 0 | 0 | 0 | 1 | 0 | 0 | 0 | 1 | TRANSFER ROUTINE |
| 8 | 0 | 0 | 0 | 1 | 0 | 0 | 0 | 0 | 1 | 1 | 0 | 1 | 0 | 0 | 0 | 1 | " |
| 9 | 0 | 0 | 0 | 1 | 0 | 0 | 1 | 0 | 1 | 1 | 0 | 1 | 0 | 0 | 0 | 1 | " |
| 10 | 0 | 0 | 0 | 1 | 0 | 1 | 0 | 0 | 1 | 1 | 0 | 1 | 0 | 0 | 0 | 1 | " |
| 11 | 0 | 0 | 0 | 1 | 0 | 1 | 1 | 0 | 1 | 1 | 0 | 1 | 0 | 0 | 0 | 1 | " |
| 12 | 0 | 0 | 0 | 1 | 1 | 0 | 0 | 0 | 1 | 1 | 0 | 1 | 0 | 0 | 0 | 1 | " |
| 13 | 0 | 0 | 0 | 1 | 1 | 0 | 1 | 0 | 1 | 1 | 0 | 1 | 0 | 0 | 0 | 1 | " |
| 14 | 0 | 0 | 0 | 1 | 1 | 1 | 0 | 0 | 1 | 1 | 0 | 1 | 0 | 0 | 0 | 1 | " |
| 15 | 0 | 0 | 0 | 1 | 1 | 1 | 1 | 0 | 1 | 1 | 0 | 1 | 0 | 0 | 0 | 1 | " |
| 16 | 0 | 0 | 1 | 0 | 0 | 0 | 0 | 0 | 1 | 1 | 0 | 1 | 0 | 0 | 0 | 1 | " |
| 17 | 0 | 0 | 1 | 0 | 0 | 0 | 1 | 0 | 1 | 1 | 0 | 1 | 0 | 0 | 0 | 1 | " |
| 18 | 0 | 0 | 1 | 0 | 0 | 1 | 0 | 0 | 1 | 1 | 0 | 1 | 0 | 0 | 0 | 1 | " |
| 19 | 0 | 0 | 1 | 0 | 0 | 1 | 1 | 0 | 1 | 1 | 0 | 1 | 0 | 0 | 0 | 1 | " |
| 20 | 0 | 0 | 1 | 0 | 1 | 0 | 0 | 0 | 1 | 1 | 0 | 1 | 0 | 0 | 0 | 1 | " |
| 21 | 0 | 0 | 1 | 0 | 1 | 0 | 1 | 0 | 1 | 1 | 0 | 1 | 0 | 0 | 0 | 1 | " |
| 22 | 0 | 0 | 1 | 0 | 1 | 1 | 0 | 0 | 1 | 1 | 0 | 1 | 0 | 0 | 0 | 1 | " |
| 23 | 0 | 0 | 1 | 0 | 1 | 1 | 1 | 0 | 1 | 1 | 0 | 1 | 0 | 0 | 0 | 1 | " |
| 24 | 0 | 0 | 1 | 1 | 0 | 0 | 0 | 0 | 1 | 1 | 0 | 1 | 0 | 0 | 0 | 1 | " |
| 25 | 0 | 0 | 1 | 1 | 0 | 0 | 1 | 0 | 1 | 1 | 0 | 1 | 0 | 0 | 0 | 1 | " |
| 26 | 0 | 0 | 1 | 1 | 0 | 1 | 0 | 0 | 1 | 1 | 0 | 1 | 0 | 0 | 0 | 1 | " |
| 27 | 0 | 0 | 1 | 1 | 0 | 1 | 1 | 0 | 1 | 1 | 0 | 1 | 0 | 0 | 0 | 1 | " |
| 28 | 0 | 0 | 1 | 1 | 1 | 0 | 0 | 1 | 0 | 0 | 1 | 0 | 0 | 0 | 0 | 1 | BRANCH TO DISPLAY LOOP |
| 29 | 0 | 0 | 1 | 1 | 1 | 0 | 1 | 1 | 0 | 0 | 1 | 0 | 0 | 0 | 0 | 0 | BRANCH TO DISPLAY LOOP VIA ARM |
| 30 | 0 | 0 | 1 | 1 | 1 | 1 | 0 | 0 | 0 | 0 | 0 | 0 | 0 | 1 | 1 | 0 | SET STATUS FF2 |
| 31 | 0 | 0 | 1 | 1 | 1 | 1 | 1 | 1 | 0 | 0 | 1 | 1 | 1 | 1 | 0 | 1 | BRANCH IF ERROR TO DISPLAY LOOP |
| 32 | 0 | 1 | 0 | 0 | 0 | 0 | 0 | 0 | 0 | 0 | 0 | 1 | 0 | 0 | 0 | 0 | ARM ENABLE |
| 33 | 0 | 1 | 0 | 0 | 0 | 0 | 1 | 0 | 0 | 0 | 0 | 1 | 0 | 0 | 0 | 1 | INITIALIZE CATHODE COUNTER, CLR RESET |
| 34 | 0 | 1 | 0 | 0 | 0 | 1 | 0 | 0 | 0 | 0 | 0 | 0 | 1 | 0 | 1 | 1 | DISPLAY LOOP |
| 35 | 0 | 1 | 0 | 0 | 0 | 1 | 1 | 0 | 0 | 1 | 0 | 1 | 0 | 1 | 0 | 0 | " |
| 36 | 0 | 1 | 0 | 0 | 1 | 0 | 0 | 0 | 0 | 1 | 0 | 1 | 0 | 1 | 0 | 0 | " |
| 37 | 0 | 1 | 0 | 0 | 1 | 0 | 1 | 0 | 0 | 1 | 0 | 1 | 0 | 1 | 0 | 0 | " |
| 38 | 0 | 1 | 0 | 0 | 1 | 1 | 0 | 0 | 1 | 0 | 1 | 0 | 0 | 0 | 0 | 0 | " |
| 39 | 0 | 1 | 0 | 0 | 1 | 1 | 1 | 0 | 1 | 0 | 1 | 0 | 0 | 0 | 0 | 0 | " |
| 40 | 0 | 1 | 0 | 1 | 0 | 0 | 0 | 0 | 1 | 0 | 1 | 0 | 0 | 0 | 0 | 0 | " |
| 41 | 0 | 1 | 0 | 1 | 0 | 0 | 1 | 0 | 1 | 0 | 1 | 0 | 0 | 0 | 0 | 0 | " |
| 42 | 0 | 1 | 0 | 1 | 0 | 1 | 0 | 0 | 0 | 0 | 0 | 0 | 0 | 0 | 0 | 0 | " |
| 43 | 0 | 1 | 0 | 1 | 0 | 1 | 1 | 0 | 0 | 0 | 0 | 0 | 0 | 0 | 0 | 0 | " |
| 44 | 0 | 1 | 0 | 1 | 1 | 0 | 0 | 0 | 0 | 0 | 0 | 0 | 0 | 0 | 0 | 0 | " |
| 45 | 0 | 1 | 0 | 1 | 1 | 0 | 1 | 0 | 0 | 0 | 0 | 0 | 0 | 0 | 0 | 0 | " |
| 46 | 0 | 1 | 0 | 1 | 1 | 1 | 0 | 0 | 0 | 0 | 0 | 0 | 0 | 0 | 0 | 0 | " |
| 47 | 0 | 1 | 0 | 1 | 1 | 1 | 1 | 0 | 0 | 0 | 0 | 0 | 0 | 0 | 0 | 0 | " |
| 48 | 0 | 1 | 1 | 0 | 0 | 0 | 0 | 0 | 0 | 0 | 0 | 0 | 0 | 0 | 0 | 0 | " |
| 49 | 0 | 1 | 1 | 0 | 0 | 0 | 1 | 0 | 0 | 0 | 0 | 0 | 0 | 0 | 0 | 0 | " |
| 50 | 0 | 1 | 1 | 0 | 0 | 1 | 0 | 0 | 0 | 0 | 0 | 0 | 0 | 0 | 0 | 0 | " |

APPENDIX A-continued

READ ONLY MEMORY 198 CODING

| | ADDRESS | | | | | | | OUTPUT | | | | | | | | | COMMENT |
|---|---|---|---|---|---|---|---|---|---|---|---|---|---|---|---|---|---|
| | $A_6$ | $A_5$ | $A_4$ | $A_3$ | $A_2$ | $A_1$ | $A_0$ | $Z_8$ | $Z_7$ | $Z_6$ | $Z_5$ | $Z_4$ | $Z_3$ | $Z_2$ | $Z_1$ | $Z_0$ | |
| 51 | 0 | 1 | 1 | 0 | 0 | 1 | 1 | 0 | 0 | 0 | 0 | 0 | 0 | 0 | 0 | 0 | '' |
| 52 | 0 | 1 | 1 | 0 | 1 | 0 | 0 | 0 | 0 | 0 | 0 | 0 | 0 | 0 | 0 | 0 | '' |
| 53 | 0 | 1 | 1 | 0 | 1 | 0 | 1 | 1 | 0 | 0 | 1 | 0 | 0 | 0 | 1 | 0 | BRANCH TO DISPLAY LOOP |
| 54 | 0 | 1 | 1 | 0 | 1 | 1 | 0 | 1 | 0 | 0 | 1 | 1 | 1 | 1 | 1 | 1 | BRANCH TO DELAY SET LOOP |
| 55 | 0 | 1 | 1 | 0 | 1 | 1 | 1 | 0 | 0 | 0 | 0 | 0 | 1 | 1 | 0 | 1 | SET DELAY COUNT DOWN |
| 56 | 0 | 1 | 1 | 1 | 0 | 0 | 0 | 1 | 0 | 0 | 1 | 0 | 0 | 0 | 1 | 0 | BRANCH TO DISPLAY LOOP |
| 57 | 0 | 1 | 1 | 1 | 0 | 0 | 1 | 0 | 0 | 0 | 0 | 0 | 1 | 0 | 0 | 0 | ARM ENABLE |
| 58 | 0 | 1 | 1 | 1 | 0 | 1 | 0 | 1 | 0 | 0 | 1 | 0 | 0 | 0 | 1 | 0 | JUMP TO DISPLAY LOOP |
| 59 | 0 | 1 | 1 | 1 | 0 | 1 | 1 | 0 | 0 | 0 | 0 | 0 | 0 | 1 | 1 | 1 | CLR FF2 |
| 60 | 0 | 1 | 1 | 1 | 1 | 0 | 0 | 1 | 0 | 0 | 0 | 0 | 0 | 1 | 1 | 1 | JUMP TO TRANSFER ROUTINE |
| 61 | 0 | 1 | 1 | 1 | 1 | 0 | 1 | 0 | 0 | 0 | 0 | 0 | 0 | 1 | 0 | 1 | SET FF1 |
| 62 | 0 | 1 | 1 | 1 | 1 | 1 | 0 | 1 | 0 | 0 | 1 | 0 | 0 | 0 | 0 | 1 | JUMP TO DISPLAY LOOP |
| 63 | 0 | 1 | 1 | 1 | 1 | 1 | 1 | 0 | 0 | 0 | 0 | 0 | 1 | 1 | 1 | 0 | CLEAR DELAY COUNTDOWN |
| 64 | 1 | 0 | 0 | 0 | 0 | 0 | 0 | 1 | 0 | 0 | 1 | 0 | 0 | 0 | 1 | 0 | BRANCH TO DISPLAY LOOP |
| 65 | 1 | 0 | 0 | 0 | 0 | 0 | 1 | 0 | 0 | 0 | 0 | 0 | 1 | 1 | 1 | 1 | DELAY SET ROUTINE |
| 66 | 1 | 0 | 0 | 0 | 0 | 1 | 0 | 0 | 0 | 0 | 0 | 1 | 1 | 1 | 0 | 0 | TRANSFER TO DELAY HOLDING REGISTER |
| 67 | 1 | 0 | 0 | 0 | 0 | 1 | 1 | 0 | 0 | 1 | 0 | 1 | 1 | 1 | 0 | 0 | '' |
| 68 | 1 | 0 | 0 | 0 | 1 | 0 | 0 | 0 | 0 | 1 | 0 | 1 | 1 | 1 | 0 | 0 | '' |
| 69 | 1 | 0 | 0 | 0 | 1 | 0 | 1 | 0 | 0 | 1 | 0 | 1 | 1 | 1 | 0 | 0 | '' |
| 70 | 1 | 0 | 0 | 0 | 1 | 1 | 0 | 0 | 0 | 1 | 0 | 1 | 1 | 1 | 0 | 0 | '' |
| 71 | 1 | 0 | 0 | 0 | 1 | 1 | 1 | 0 | 0 | 1 | 0 | 1 | 1 | 1 | 0 | 0 | '' |
| 72 | 1 | 0 | 0 | 1 | 0 | 0 | 0 | 0 | 0 | 1 | 0 | 1 | 1 | 1 | 0 | 0 | '' |
| 73 | 1 | 0 | 0 | 1 | 0 | 0 | 1 | 0 | 0 | 1 | 0 | 1 | 1 | 1 | 0 | 0 | '' |
| 74 | 1 | 0 | 0 | 1 | 0 | 1 | 0 | 0 | 0 | 1 | 0 | 1 | 1 | 1 | 0 | 0 | '' |
| 75 | 1 | 0 | 0 | 1 | 0 | 1 | 1 | 0 | 0 | 1 | 0 | 1 | 1 | 1 | 0 | 0 | '' |
| 76 | 1 | 0 | 0 | 1 | 1 | 0 | 0 | 0 | 0 | 1 | 0 | 1 | 1 | 1 | 0 | 0 | '' |
| 77 | 1 | 0 | 0 | 1 | 1 | 0 | 1 | 0 | 0 | 1 | 0 | 1 | 1 | 1 | 0 | 0 | '' |
| 78 | 1 | 0 | 0 | 1 | 1 | 1 | 0 | 0 | 0 | 1 | 0 | 1 | 1 | 1 | 0 | 0 | '' |
| 79 | 1 | 0 | 0 | 1 | 1 | 1 | 1 | 0 | 0 | 1 | 0 | 1 | 1 | 1 | 0 | 0 | '' |
| 80 | 1 | 0 | 1 | 0 | 0 | 0 | 0 | 0 | 0 | 1 | 0 | 1 | 1 | 1 | 0 | 0 | '' |
| 81 | 1 | 0 | 1 | 0 | 0 | 0 | 1 | 0 | 0 | 1 | 0 | 1 | 1 | 1 | 0 | 0 | '' |
| 82 | 1 | 0 | 1 | 0 | 0 | 1 | 0 | 0 | 0 | 1 | 0 | 1 | 1 | 1 | 0 | 0 | '' |
| 83 | 1 | 0 | 1 | 0 | 0 | 1 | 1 | 0 | 0 | 1 | 0 | 1 | 1 | 1 | 0 | 0 | '' |
| 84 | 1 | 0 | 1 | 0 | 1 | 0 | 0 | 0 | 0 | 1 | 0 | 1 | 1 | 1 | 0 | 0 | '' |
| 85 | 1 | 0 | 1 | 0 | 1 | 0 | 1 | 0 | 0 | 1 | 0 | 1 | 1 | 1 | 0 | 0 | '' |
| 86 | 1 | 0 | 1 | 0 | 1 | 1 | 0 | 0 | 0 | 1 | 0 | 1 | 1 | 1 | 0 | 0 | '' |
| 87 | 1 | 0 | 1 | 0 | 1 | 1 | 1 | 0 | 0 | 0 | 0 | 1 | 0 | 0 | 1 | 0 | TRANSFER TO DISPLAY STORAGE REGISTER |
| 88 | 1 | 0 | 1 | 1 | 0 | 0 | 0 | 0 | 0 | 1 | 0 | 1 | 0 | 0 | 1 | 0 | '' |
| 89 | 1 | 0 | 1 | 1 | 0 | 0 | 1 | 0 | 0 | 1 | 0 | 1 | 0 | 0 | 1 | 0 | '' |
| 90 | 1 | 0 | 1 | 1 | 0 | 1 | 0 | 0 | 0 | 1 | 0 | 1 | 0 | 0 | 1 | 0 | '' |
| 91 | 1 | 0 | 1 | 1 | 0 | 1 | 1 | 0 | 0 | 1 | 0 | 1 | 0 | 0 | 1 | 0 | '' |
| 92 | 1 | 0 | 1 | 1 | 1 | 0 | 0 | 0 | 0 | 1 | 0 | 1 | 0 | 0 | 1 | 0 | '' |
| 93 | 1 | 0 | 1 | 1 | 1 | 0 | 1 | 0 | 0 | 1 | 0 | 1 | 0 | 0 | 1 | 0 | '' |
| 94 | 1 | 0 | 1 | 1 | 1 | 1 | 0 | 0 | 0 | 1 | 0 | 1 | 0 | 0 | 1 | 0 | '' |
| 95 | 1 | 0 | 1 | 1 | 1 | 1 | 1 | 0 | 0 | 1 | 0 | 1 | 0 | 0 | 1 | 0 | '' |
| 96 | 1 | 1 | 0 | 0 | 0 | 0 | 0 | 0 | 0 | 1 | 0 | 1 | 0 | 0 | 1 | 0 | '' |
| 97 | 1 | 1 | 0 | 0 | 0 | 0 | 1 | 0 | 0 | 1 | 0 | 1 | 0 | 0 | 1 | 0 | '' |
| 98 | 1 | 1 | 0 | 0 | 0 | 1 | 0 | 0 | 0 | 1 | 0 | 1 | 0 | 0 | 1 | 0 | '' |
| 99 | 1 | 1 | 0 | 0 | 0 | 1 | 1 | 0 | 0 | 1 | 0 | 1 | 0 | 0 | 1 | 0 | '' |
| 100 | 1 | 1 | 0 | 0 | 1 | 0 | 0 | 0 | 0 | 1 | 0 | 1 | 0 | 0 | 1 | 0 | '' |
| 101 | 1 | 1 | 0 | 0 | 1 | 0 | 1 | 0 | 0 | 1 | 0 | 1 | 0 | 0 | 1 | 0 | '' |
| 102 | 1 | 1 | 0 | 0 | 1 | 1 | 0 | 0 | 0 | 1 | 0 | 1 | 0 | 0 | 1 | 0 | '' |
| 103 | 1 | 1 | 0 | 0 | 1 | 1 | 1 | 0 | 0 | 1 | 0 | 1 | 0 | 0 | 1 | 0 | '' |
| 104 | 1 | 1 | 0 | 1 | 0 | 0 | 0 | 0 | 0 | 1 | 0 | 1 | 0 | 0 | 1 | 0 | '' |
| 105 | 1 | 1 | 0 | 1 | 0 | 0 | 1 | 0 | 0 | 1 | 0 | 1 | 0 | 0 | 1 | 0 | '' |
| 106 | 1 | 1 | 0 | 1 | 0 | 1 | 0 | 0 | 0 | 1 | 0 | 1 | 0 | 0 | 1 | 0 | '' |
| 107 | 1 | 1 | 0 | 1 | 0 | 1 | 1 | 0 | 0 | 1 | 0 | 1 | 0 | 0 | 1 | 0 | '' |
| 108 | 1 | 1 | 0 | 1 | 1 | 0 | 0 | 1 | 0 | 0 | 1 | 0 | 0 | 0 | 0 | 1 | JUMP TO DISPLAY LOOP |
| 109 | 1 | 1 | 0 | 1 | 1 | 0 | 1 | 1 | 0 | 0 | 0 | 0 | 0 | 0 | 0 | 0 | JUMP TO ENTRY |
| 110 | 1 | 1 | 0 | 1 | 1 | 1 | 0 | 1 | 0 | 0 | 0 | 0 | 0 | 0 | 0 | 0 | '' |
| 111 | 1 | 1 | 0 | 1 | 1 | 1 | 1 | 1 | 0 | 0 | 0 | 0 | 0 | 0 | 0 | 0 | '' |
| 112 | 1 | 1 | 1 | 0 | 0 | 0 | 0 | 1 | 0 | 0 | 0 | 0 | 0 | 0 | 0 | 0 | '' |
| 113 | 1 | 1 | 1 | 0 | 0 | 0 | 1 | 1 | 0 | 0 | 0 | 0 | 0 | 0 | 0 | 0 | '' |
| 114 | 1 | 1 | 1 | 0 | 0 | 1 | 0 | 1 | 0 | 0 | 0 | 0 | 0 | 0 | 0 | 0 | '' |
| 115 | 1 | 1 | 1 | 0 | 0 | 1 | 1 | 1 | 0 | 0 | 0 | 0 | 0 | 0 | 0 | 0 | '' |
| 116 | 1 | 1 | 1 | 0 | 1 | 0 | 0 | 1 | 0 | 0 | 0 | 0 | 0 | 0 | 0 | 0 | '' |
| 117 | 1 | 1 | 1 | 0 | 1 | 0 | 1 | 1 | 0 | 0 | 0 | 0 | 0 | 0 | 0 | 0 | '' |
| 118 | 1 | 1 | 1 | 0 | 1 | 1 | 0 | 1 | 0 | 0 | 0 | 0 | 0 | 0 | 0 | 0 | '' |
| 119 | 1 | 1 | 1 | 0 | 1 | 1 | 1 | 1 | 0 | 0 | 0 | 0 | 0 | 0 | 0 | 0 | '' |
| 120 | 1 | 1 | 1 | 1 | 0 | 0 | 0 | 1 | 0 | 0 | 0 | 0 | 0 | 0 | 0 | 0 | '' |
| 121 | 1 | 1 | 1 | 1 | 0 | 0 | 1 | 1 | 0 | 0 | 0 | 0 | 0 | 0 | 0 | 0 | '' |
| 122 | 1 | 1 | 1 | 1 | 0 | 1 | 0 | 1 | 0 | 0 | 0 | 0 | 0 | 0 | 0 | 0 | '' |

APPENDIX A-continued

| | READ ONLY MEMORY 198 CODING | | | | | | | | | | | | | | | | |
|---|---|---|---|---|---|---|---|---|---|---|---|---|---|---|---|---|---|
| | ADDRESS | | | | | | | OUTPUT | | | | | | | | | COMMENT |
| | $A_6$ | $A_5$ | $A_4$ | $A_3$ | $A_2$ | $A_1$ | $A_0$ | $Z_8$ | $Z_7$ | $Z_6$ | $Z_5$ | $Z_4$ | $Z_3$ | $Z_2$ | $Z_1$ | $Z_0$ | |
| 123 | 1 | 1 | 1 | 1 | 0 | 1 | 1 | 1 | 0 | 0 | 0 | 0 | 0 | 0 | 0 | 0 | '' |
| 124 | 1 | 1 | 1 | 1 | 1 | 0 | 0 | 1 | 0 | 0 | 0 | 0 | 0 | 0 | 0 | 0 | '' |
| 125 | 1 | 1 | 1 | 1 | 1 | 0 | 1 | 1 | 0 | 0 | 0 | 0 | 0 | 0 | 0 | 0 | '' |
| 126 | 1 | 1 | 1 | 1 | 1 | 1 | 0 | 1 | 0 | 0 | 0 | 0 | 0 | 0 | 0 | 0 | '' |
| 127 | 1 | 1 | 1 | 1 | 1 | 1 | 1 | 1 | 0 | 0 | 0 | 0 | 0 | 0 | 0 | 0 | '' |

We claim:

1. A method for testing a digital electronic circuit comprising the steps of:
   generating a first signature word having a predetermined length from a first digital signal available during a first period of time at a selected location in the digital electronic circuit operating in a predetermined mode by combining each of a selected plurality of bits of the digital signal with preselected other ones of the selected plurality of bits;
   generating a second signature word having the same predetermined length from a second digital signal available during a second period of time at the selected location in the digital electronic circuit operating in the predetermined mode by combining each of the same selected plurality of bits of the digital signal with the same preselected other ones of the selected plurality of bits; and
   comparing the first signature word with the second signature word and indicating when there is a difference between the first signature word and the second signature word.

2. A method as in claim 1 in which the first and second time periods encompass successive repetitions of the selected plurality of bits of the digital signal.

3. A method as in claim 1 wherein the steps of generating the first and second signature words each further comprise sequentially combining the bits of the selected plurality of bits of the digitial signal with bits resulting from the combination of preceding ones of the selected plurality of bits of the digital signal.

4. A method as in claim 2 wherein the steps of generating the first and second signature words each further comprise sequentially shifting each of the selected plurality of bits of the digital signals into a multielement shift register having a length at least as great as the first and second signature words and combining output bits of preselected ones of the shift register elements with input bits to the shift register.

5. A method as in claim 2 comprising the further steps of detecting a predetermined sequence of bits in the digital electronic circuit and initiating the step of generating a signature word in response to the detection of the predetermined sequence of bits in the digital electronic circuit.

6. A method as in claim 5 wherein the selected plurality of bits of the digital signal is determined by counting a selectable number of timing pulses from the digital electronic circuit after the initiation of the step of generating a signature word and terminating the step of generating a signature word when the selectable number of timing pulses has been counted.

7. A method as in claim 1 further comprising the steps of:
   inhibiting the generation of any further signature words when there is a difference between the first signature word and the second signature word; and
   displaying the second signature word.

8. An apparatus for testing a digital electronic circuit comprising:
   input means for receiving a digital signal from a selected location in the digital electronic circuit;
   clock means for delivering a series of clock pulses, each pulse being coincident with a bit of the digital signal;
   signature generation means connected to the input means and the clock means for generating a signature word from the digital signal by combining each of a selected plurality of bits of the digital signal with preselected other ones of the selected plurality of bits of the digital signal;
   indicator means connected to the signature generation means for indicating the signature word;
   trigger means connectible to the digital electronic circuit and connected to the signature generation means for initiating the generation of a signature word in response to a predetermined trigger signal from the digital electronic circuit; and
   stop means connected to the signature generation means for terminating the generation of a signature word, including a digital delay generator connected to the clock means for providing a stop signal to the signature generation means in response to the receipt of a predetermined number of clock pulses corresponding to the number of the selected plurality of bits of the digital signal.

9. An apparatus as in claim 8 including a hand-held probe containing an input probe tip connected to the input means and a visual display connected to the indicator means for visually displaying signature words.

10. An apparatus as in claim 8 including a visual display connected to the indicator means wherein the signature word is displayed on the visual display using a hexadecimal character set.

11. A method for testing a digital electronic circuit comprising the steps of:
   providing a reference digital electronic circuit operating in a predetermined mode;
   detecting a predetermined sequence of bits from the reference digital electronic circuit;
   generating, in response to the detection of said predetermined sequence of bits, a reference signature word having a predetermined length from a reference digital signal, available at a selected location in the reference digital electronic circuit, by combining each of selected plurality of bits of the reference digital signal with preselected other ones of the selected plurality of bits of the reference digital signal;

providing a test digital electronic circuit operating in the same predetermined mode;

detecting the same predetermined sequence of bits from the test digital electronic circuit; and generating, in response to the detection of said predetermined sequence of bits from the test digital electronic circuit, a test signature word having the same predetermined length from a test digital signal, available at the same selected location in the test digital electronic circuit, by combining each of the same selected plurality of bits of the test digital signal with the same preselected other ones of the selected plurality of bits of the test digital signal for comparison with the reference signature word for determining whether the test digital electronic circuit is operating in a desired manner.

12. A method as in claim 11 wherein the selected plurality of bits of the reference digital signal is determined by counting a selectable number of timing pulses from the reference digital electronic circuit after detection of the predetermined sequence of bits from the reference digital electronic circuit and terminating the step of generating the reference signature word when the selectable number of timing pulses has been counted, and the selected plurality of bits of the test digital signal is determined by counting the same selectable number of timing pulses from the test digital electronic circuit after detection of the predetermined sequence of bits from the test digital electronic circuit and terminating the step of generating the test signature word when the selectable number of timing pulses has been counted.

13. An apparatus for testing a digital electronic circuit comprising:

input means for receiving a digital signal from a selected location in the digital electronic circuit;

clock means for delivering a series of clock pulses, each pulse being coincident with a bit of the digital signal;

signature generation means connected to the input means and the clock means for generating a signature word from the digital signal by combining each of a selected plurality of bits of the digital signal with preselected other ones of the selected plurality of bits of the digital signal;

indicator means connected to the signature generation means for indicating the signature word;

trigger means having an input connectible to the digital electronic circuit, having an output coupled to the signature generation means for initiating the generation of a signature word in response to a predetermined trigger signal from the digital electronic circuit, and including a bit pattern selector means for storing a preselected bit pattern and comparator means coupled to the trigger means input and to the bit pattern selector means for comparing the predetermined trigger signal with a preselected bit pattern stored by the bit pattern selector means for producing a trigger output signal when the predetermined trigger signal is coincident with the preselected bit pattern, the trigger output signal causing initiation of the generation of a signature word; and stop means connected to the signature generation means for terminating the generation of a signature word.

14. An apparatus as in claim 13 including trigger delay means connected to the clock means and the comparator means for delaying initiation of the generation of a signature word for a selectable number of clock pulses after the occurrence of the trigger output signal.

15. An apparatus as in claim 13 wherein each bit of the predetermined trigger signal is available simulatneously at a different point in the digital electronic circuit, and the trigger means includes a plurality of parallel inputs connected to the different points in the digital electronic circuit.

16. An apparatus for testing a digital electronic circuit comprising:

input means for receiving a digital signal from a selected location in the digital electronic circuit;

clock means for delivering a series of clock pulses, each pulse being coincident with a bit of the digital signal;

signature generation means connected to the input means and the clock means for generating a signature word from the digital signal by combining each of a selected plurality of bits of the digital signal with preselected other ones of the selected plurality of bits of the digital signal;

indicator means connected to the signature generation means for indicating the signature word;

trigger means connectible to the digital electronic circuit and connected to the signature generation means for initiating the generation of a signature word in response to a predetermined trigger signal from the digital electronic circuit; and stop means having an input connectible to the digital electronic circuit for receiving a predetermined stop signal therefrom, an output coupled to the signature generation means, and including a bit pattern selector means for storing a preselected bit pattern and comparator means coupled to the stop means input and to the bit pattern selector means for comparing the predetermined stop signal with a preselected bit pattern stored by the bit pattern selector means for producing a stop output signal on said output when the predetermined stop signal is coincident with the preselected bit pattern, the stop output signal causing termination of the generation of a signature word.

17. An apparatus for testing a digital electronic circuit comprising:

input means for receiving a digital signal from a selected location in the digital electronic circuit;

clock means for delivering a series of clock pulses, each pulse being coincident with a bit of the digital signal;

signature generation means connected to the input means and the clock means for generating a signature word from the digital signal by combining each of a selected plurality of bits of the digital signal with preselected other ones of the selected plurality of bits of the digital signal;

indicator means connected to the signature generation means for indicating the signature word;

trigger means connectible to the digital electronic circuit and connected to the signature generation means for initiating the generation of a signature word in response to a predetermined trigger signal from the digital electronic circuit;

stop means connected to the signature generation means for terminating the generation of a signature word; and storage means coupled to the signature generation means for storing a signature word generated during a first time period and comparator means coupled to the signature generation means and the storage means for comparing the signature word stored in the storage means with a signature word generated during a second subsequent time period and for giving an output indication to the indicator means of whether there has been a change in the selected plurality of bits of the digital signal from the first time period to the second time period.

18. An apparatus as in claim 17 further comprising latch means coupled to the comparator means and the signature generation means to inhibit the generation of subsequent signature words in response to the detection of a change in the selected plurality of bits of the digital signal from the first time period to the second time period.

19. An apparatus for testing a digital electronic circuit comprising:
input means for receiving a digital signal from a selected location in the digital electronic circuit;
clock means for delivering a series of clock pulses, each pulse being coincident with a bit of the digital signal;
signature generation means connected to the input means and the clock means for generating a signature word from the digital signal by combining each of a selected plurality of bits of the digital signal with preselected other ones of the selected plurality of bits of the digital signal;
indicator means connected to the signature generation means for indicating the signature word;
trigger means connectible to the digital electronic circuit and connected to the signature generation means for initiating the generation of a signature word in response to a predetermined trigger signal from the digital electronic circuit;
stop means connected to the signature generation means for terminating the generation of a signature word; and
reference means connected to the signature generation means for storing a reference signature word indicative of a digital signal from a reference digital electronic circuit that is operating in a desired manner and for comparing the reference signature word with the signature word generated by the signature generation means to give an output indication of whether the digital electronic circuit is operating in the desired manner.

20. A method for testing a digital electronic circuit comprising the steps of:
generating a reference signature word having a predetermined length from a reference digital signal, available at a selected location in a reference digital electronic circuit operating in a predetermined mode, by combining each of a selected plurality of bits of the reference digital signal with preselected other ones of the selected plurality of bits of the reference digital signal;
providing a diagram of the digital electronic circuit;
recording the reference signature word on the diagram;
generating a test signature word having the same predetermined length from a test digital signal, available at the same selected location in a test digital electronic circuit operating in the predetermined mode, by combining each of the same selected plurality of bits of the test digital signal with the same preselected other ones of the selected plurality of bits of the test digital signal; and
comparing the test signature word with the reference signature word recorded on the diagram for determining whether the test digital electronic circuit is operating in a desired manner.

21. A method as in claim 20 wherein the step of recording the reference signature word includes recording the reference signature word on the diagram adjacent to a diagrammatic representation of the selected location.

* * * * *

UNITED STATES PATENT AND TRADEMARK OFFICE
CERTIFICATE OF CORRECTION

PATENT NO. : 3,976,864
DATED : August 24, 1976
INVENTOR(S) : Gary B. Gordon, et al.

It is certified that error appears in the above-identified patent and that said Letters Patent are hereby corrected as shown below:

Column 1, line 24, cancel "on" and substitute -- in --.
Column 4, line 67, cancel "FIG. 2" and substitute -- FIGS. 2A and 2B --.
Column 5, line 2, cancel "FIG. 2" and substitute -- FIGS. 2A and 2B --.
Column 5, line 44, cancel "FIG. 4" and substitute -- FIGS. 4A and 4B --.
Column 7, line 32, cancel "$Q_C Q_B Q_A$" and substitute -- $\underline{Q_C Q_B Q_A}$ --.
Column 8, line 32, cancel "received" and substitute -- receives --.
Column 11, line 9, cancel "FIG. 6" and substitute -- FIG. 6B --.
Column 11, line 24, cancel "FIG. 6" and substitute -- FIG. 6A --.
Column 14, line 38, cancel "15L" and substitute -- 15L) --.
Column 14, line 51, cancel "Lo" and substitute -- LO --.
Column 14, line 57, cancel "Lo" and substitute -- LO --.
Column 15, line 33, after the number "9" insert the word -- by --.
Column 16, line 47, cancel "schematic" and substitute -- schematics --.

Signed and Sealed this

Seventh Day of December 1976

[SEAL]

Attest:

RUTH C. MASON
Attesting Officer

C. MARSHALL DANN
Commissioner of Patents and Trademarks